(12) United States Patent
Wang et al.

(10) Patent No.: US 9,124,377 B2
(45) Date of Patent: Sep. 1, 2015

(54) METHODS AND APPARATUS FOR ENABLING PEER-TO-PEER (P2P) COMMUNICATION IN LTE TIME DIVISION DUPLEX (TDD) SYSTEM

(71) Applicant: QUALCOMM Incorporated, San Diego, CA (US)

(72) Inventors: Hua Wang, Bridgewater, NJ (US); Mingkai Nan, San Diego, CA (US); Shailesh Patil, Bridgewater, NJ (US); Junyi Li, Chester, NJ (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/671,333

(22) Filed: Nov. 7, 2012

(65) Prior Publication Data

US 2014/0126432 A1    May 8, 2014

(51) Int. Cl.
  *H04H 20/71* (2008.01)
  *H04B 7/26* (2006.01)
  *H04W 76/02* (2009.01)

(52) U.S. Cl.
  CPC ............. *H04H 20/71* (2013.01); *H04B 7/2656* (2013.01); *H04W 76/023* (2013.01)

(58) Field of Classification Search
  CPC ...... Y02B 60/50; H04W 28/06; H04W 48/12; H04W 4/005; H04W 48/14; H04W 4/06; H04W 52/0206; H04W 72/005; H04W 72/0406; H04W 76/023; H04B 7/2656; H04H 20/71; H04L 1/0026; H04L 1/0031
  USPC ............................ 370/254–350; 709/201–213
  See application file for complete search history.

(56) References Cited

U.S. PATENT DOCUMENTS

| 7,239,874 B2 | 7/2007 | Reddy et al. |
| 8,369,800 B2 | 2/2013 | Li et al. |

(Continued)

FOREIGN PATENT DOCUMENTS

| WO | 08034029 | 3/2008 |
| WO | 2008034038 A1 | 3/2008 |

(Continued)

OTHER PUBLICATIONS

International Search Report and Written Opinion—PCT/US2013/068881—ISA/EPO—Feb. 17, 2014.

*Primary Examiner* — Ayaz Sheikh
*Assistant Examiner* — Debebe Asefa
(74) *Attorney, Agent, or Firm* — James K. O'Hare

(57) ABSTRACT

A method, an apparatus, and a computer program product for wireless communication are provided. The apparatus receives a configuration indicating multicast broadcast single frequency network (MBSFN) subframes within a radio frame. The configuration indicates a number of symbols of an MBSFN subframe for receiving a wide area network (WAN) control signal and remaining symbols of the MBSFN subframe dedicated for peer-to-peer communication. The apparatus communicates with a peer via the symbols dedicated for peer-to-peer communication. Alternatively, the apparatus receives a configuration indicating a portion at a beginning and/or end of a guard period of a special time division duplex (TDD) subframe. The portion is reserved for an uplink timing advance and/or switching from transmission to reception and/or reception to transmission. The configuration also indicates a remaining portion of the guard period of the special TDD subframe for peer-to-peer communication. The apparatus communicates with a peer via the remaining portion.

54 Claims, 20 Drawing Sheets

(56) References Cited

U.S. PATENT DOCUMENTS

| | | |
|---|---|---|
| 8,675,537 B2 * | 3/2014 | Khandekar et al. ........... 370/312 |
| 2007/0274275 A1 | 11/2007 | Laroia et al. |
| 2007/0291714 A1 | 12/2007 | Laroia et al. |
| 2008/0069033 A1 | 3/2008 | Li et al. |
| 2010/0128701 A1 | 5/2010 | Nagaraja |
| 2010/0136997 A1 * | 6/2010 | Palanki et al. ............. 455/452.1 |
| 2011/0143696 A1 | 6/2011 | Luo et al. |
| 2011/0216842 A1 | 9/2011 | Zhang et al. |
| 2011/0255450 A1 * | 10/2011 | Wang et al. ................... 370/280 |
| 2012/0044841 A1 | 2/2012 | Chen |
| 2012/0117155 A1 | 5/2012 | Li et al. |
| 2012/0294209 A1 | 11/2012 | Periyalwar et al. |
| 2013/0039262 A1 | 2/2013 | Lim et al. |
| 2013/0089010 A1 | 4/2013 | Richardson et al. |
| 2014/0029568 A1 | 1/2014 | Wang et al. |
| 2014/0119261 A1 * | 5/2014 | Wang et al. ................... 370/312 |

FOREIGN PATENT DOCUMENTS

| | | |
|---|---|---|
| WO | 2011130626 A1 | 10/2011 |
| WO | WO 2011130630 A1 * | 10/2011 |
| WO | WO-2011130630 A1 | 10/2011 |
| WO | WO-2012048464 A1 | 4/2012 |
| WO | 2012068731 A1 | 5/2012 |
| WO | WO-2013108219 A1 | 7/2013 |

* cited by examiner

METHODS AND APPARATUS FOR ENABLING PEER-TO-PEER (P2P) COMMUNICATION IN LTE TIME DIVISION DUPLEX (TDD) SYSTEM

BACKGROUND

1. Field

The present disclosure relates generally to communication systems, and more particularly, to enabling peer-to-peer communication in a long term evolution (LTE) time division duplex (TDD) system, wherein part of LTE TDD subframes are configured to be used for peer-to-peer communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a configuration indicating multicast broadcast single frequency network (MBSFN) subframes within a radio frame, the configuration indicating a number of symbols of an MBSFN subframe for receiving a wide area network (WAN) control signal, the configuration indicating remaining symbols of the MBSFN subframe dedicated for peer-to-peer communication, and communicates signals with a peer via the symbols dedicated for peer-to-peer communication.

In another aspect, the apparatus receives a configuration indicating a portion at a beginning and/or end of a guard period of a special time division duplex (TDD) subframe, the configuration indicating a remaining portion of the guard period of the special TDD subframe for peer-to-peer communication, and communicates signals with a peer via the remaining portion.

In a further aspect, the apparatus receives a configuration indicating uplink time division duplex (TDD) subframes of a radio frame configured for peer-to-peer communication, the configuration indicating at least one downlink TDD subframe of the radio frame that does not send system synchronization signals as a multicast broadcast single frequency network (MBSFN) subframe, the MBSFN subframe configured for peer-to-peer communication, the configuration indicating a guard period in special TDD subframes of the radio frame configured for peer-to-peer communication, and communicates signals with a peer via at least one of the uplink TDD subframes, the MBSFN subframe, or the guard period configured for peer-to-peer communication.

In an aspect of the disclosure, the apparatus generates a configuration indicating multicast broadcast single frequency network (MBSFN) subframes within a radio frame, the configuration indicating a number of symbols of an MBSFN subframe for transmitting a wide area network (WAN) control signal, the configuration indicating remaining symbols of the MBSFN subframe dedicated for peer-to-peer communication, and transmits the configuration to at least one user equipment (UE).

In another aspect, the apparatus generates a configuration indicating a portion at a beginning and/or end of a guard period of a special time division duplex (TDD) subframe, the configuration indicating a remaining portion of the guard period of the special TDD subframe for peer-to-peer communication, and transmits the configuration to at least one UE.

In a further aspect, the apparatus generates a configuration indicating uplink TDD subframes of a radio frame configured for peer-to-peer communication, the configuration indicating at least one downlink TDD subframe of the radio frame that does not send system synchronization signals as a multicast broadcast single frequency network (MBSFN) subframe, the MBSFN subframe configured for peer-to-peer communication, the configuration indicating a guard period in special TDD subframes of the radio frame configured for peer-to-peer communication, and transmits the configuration to at least one UE.

DETAILED DESCRIPTION

Figure 1:
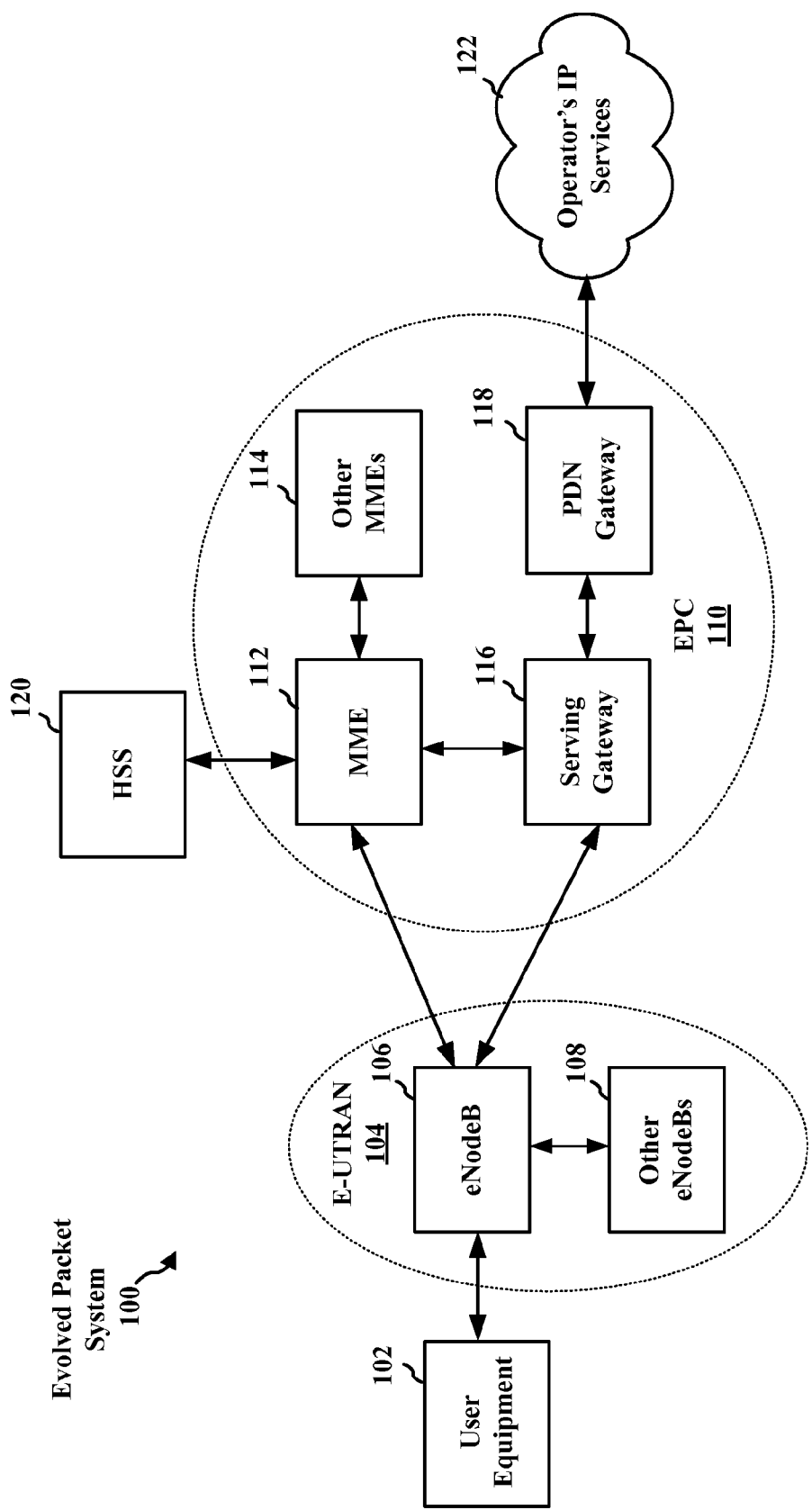
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
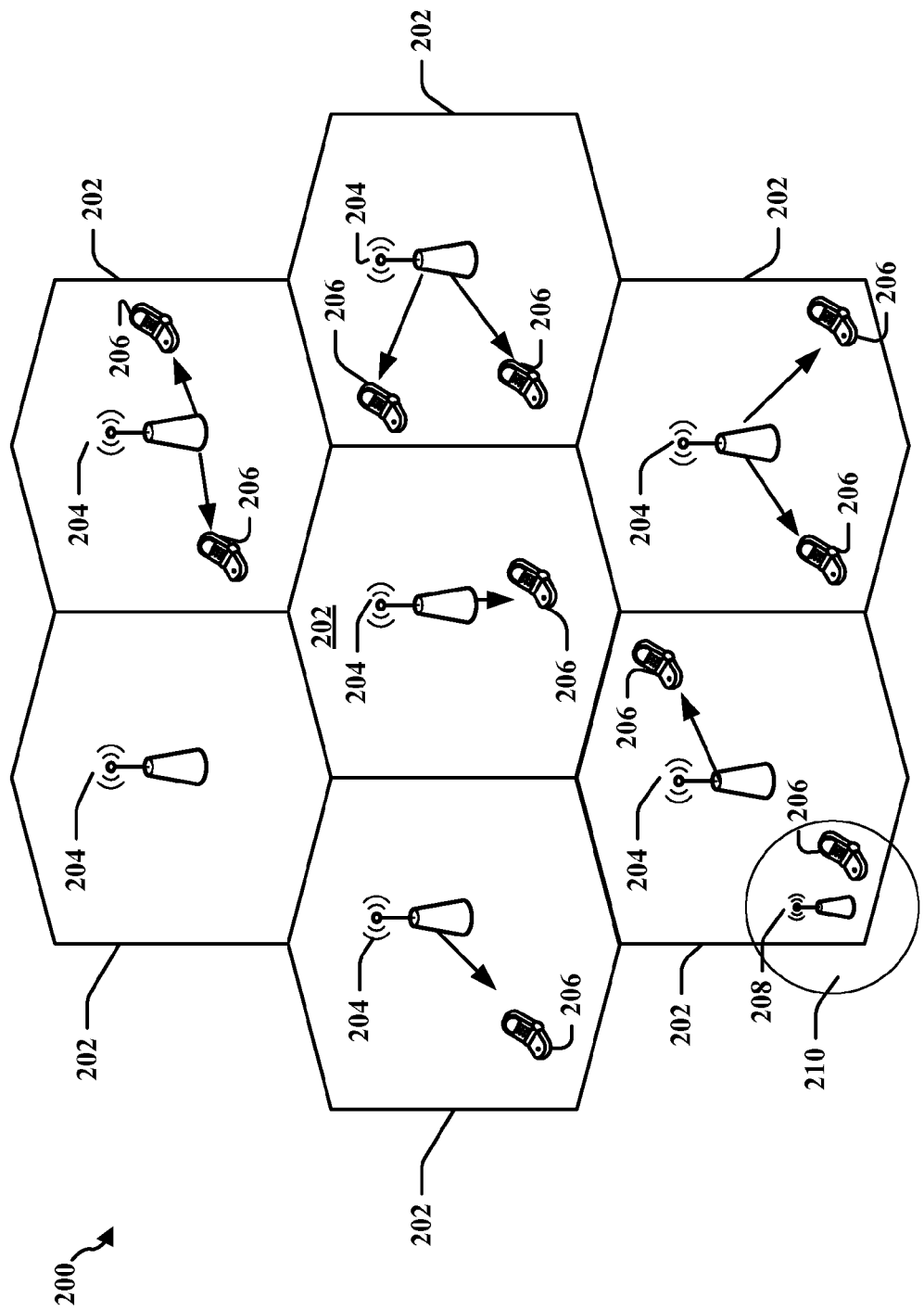
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
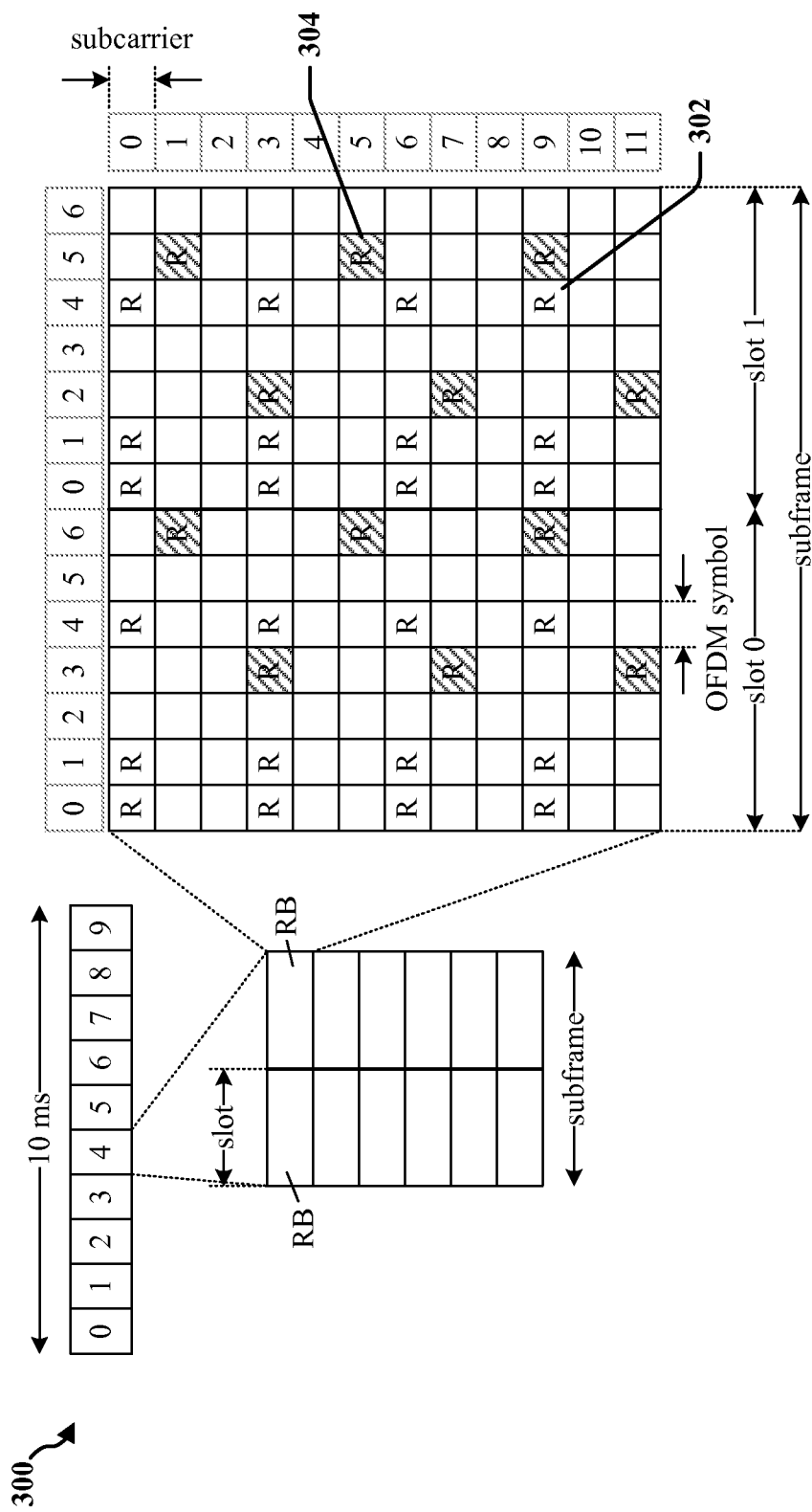
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
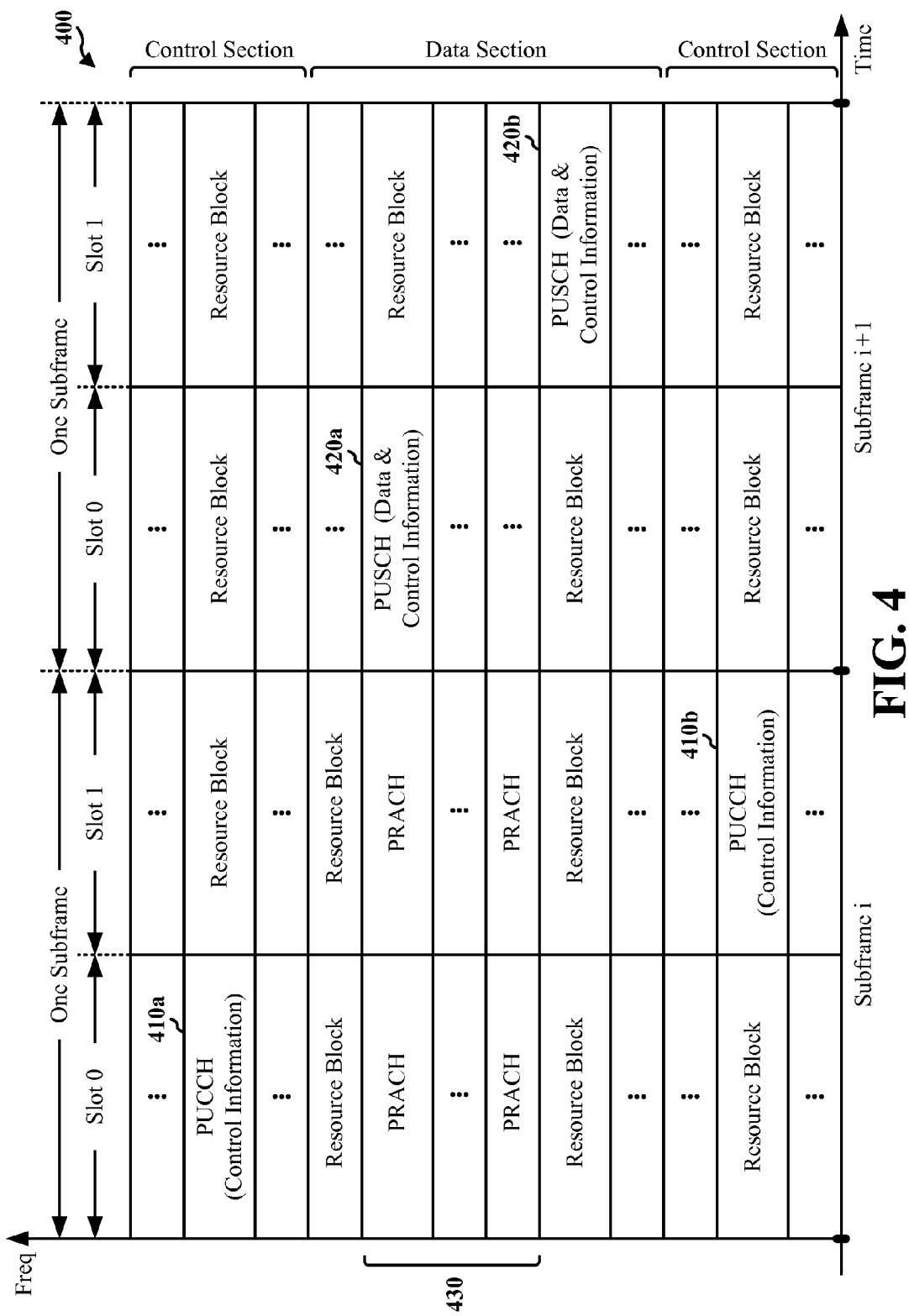
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
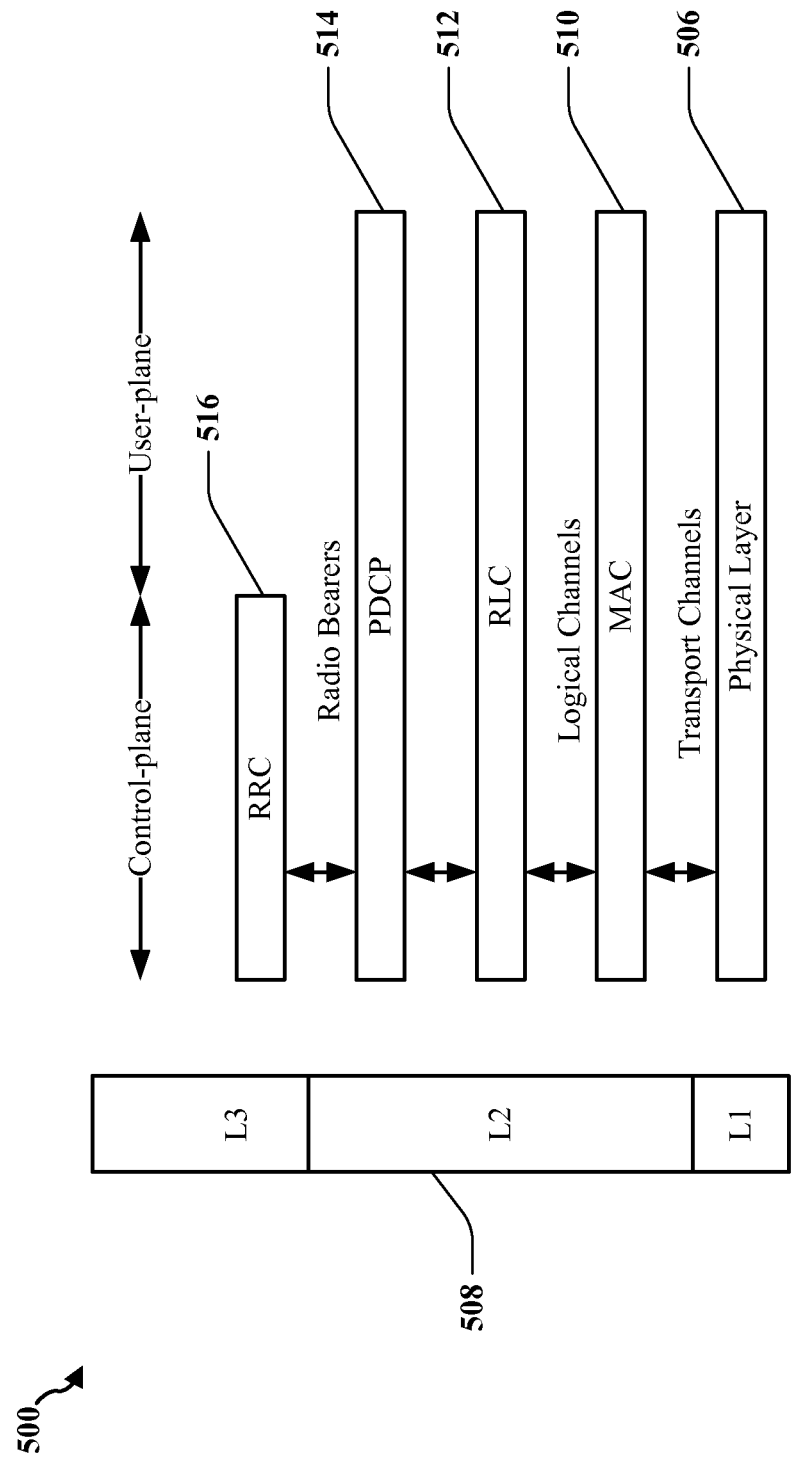
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
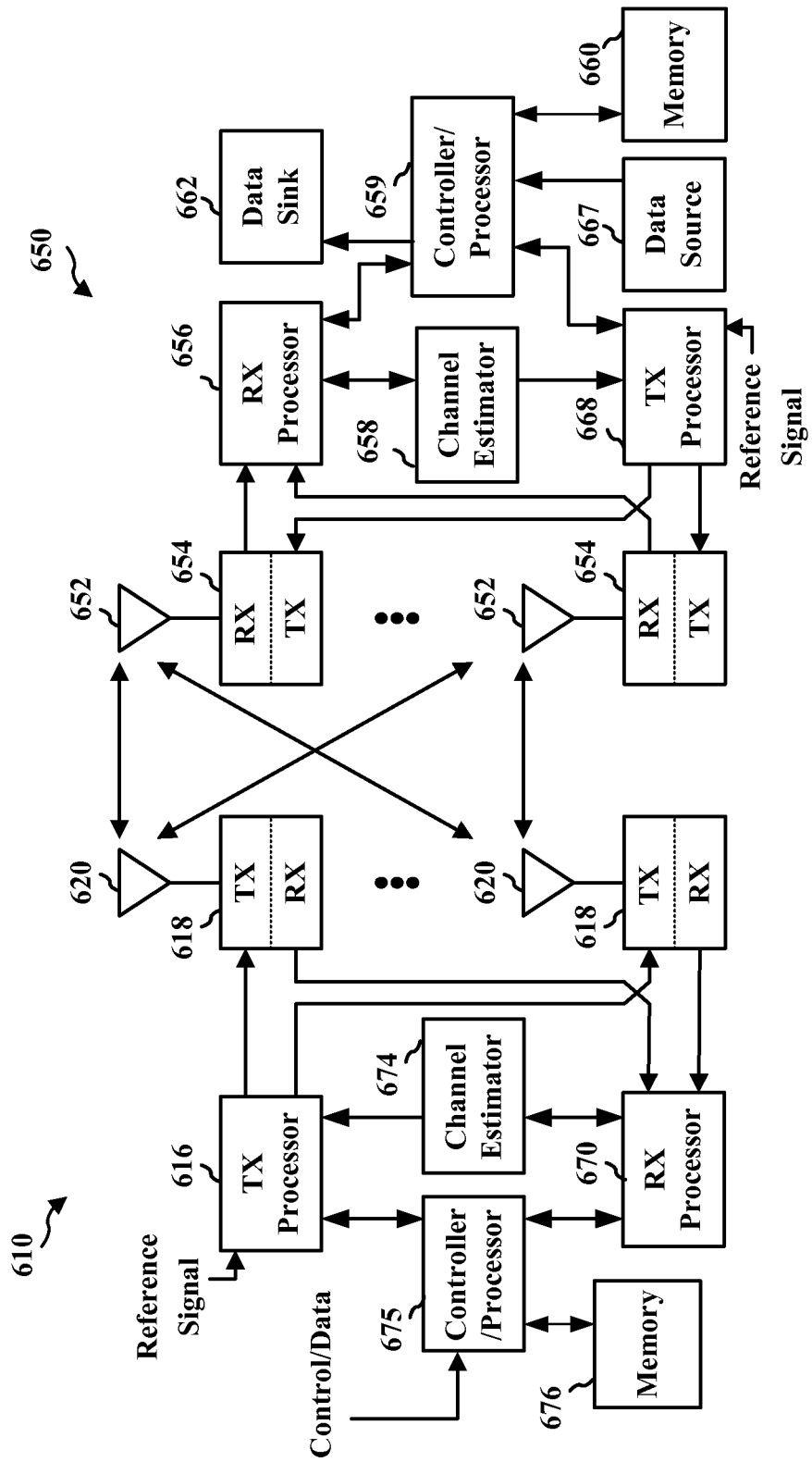
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
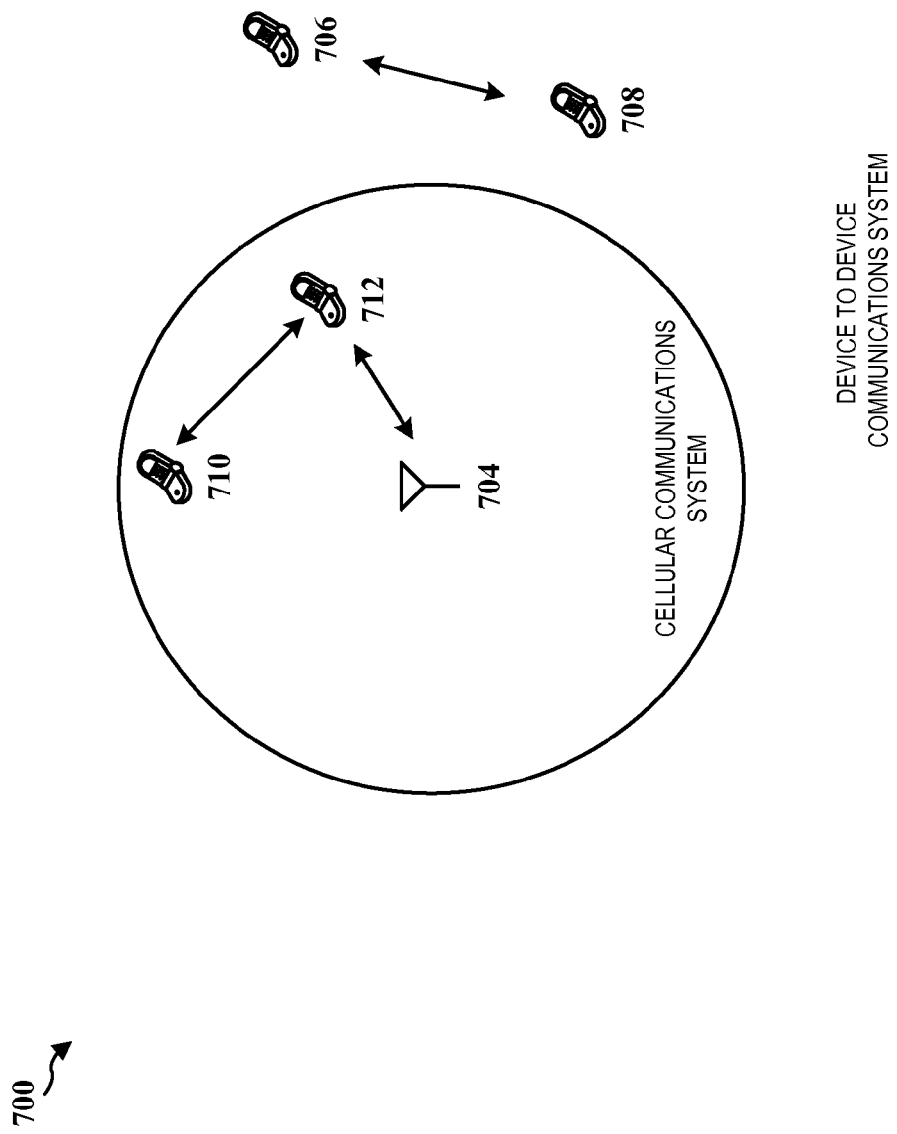
FIG. 7 is a diagram of an exemplary device-to-device (D2D) or peer-to-peer (P2P) communications system.

FIG. 7 is a diagram 700 of an exemplary device-to-device (D2D) or peer-to-peer (P2P) communications system. The device-to-device communications system 700 includes a plurality of wireless devices 706, 708, 710, 712. The device-to-device communications system 700 may overlap with a cellular communications system, such as for example, a wireless wide area network (WWAN). Some of the wireless devices 706, 708, 710, 712 may communicate together in device-to-device communication or peer-to-peer communication, some may communicate with the base station 704, and some may do both. Device-to-device communication (or peer-to-peer communication) may be effectuated by directly transferring signals between the wireless devices. Thus, the signals need not traverse through an access node (e.g., a base station) or centrally managed network. Device-to-device communication may provide short range, high data rate communication (e.g., within a home or office type setting). As shown in FIG. 7, the wireless devices 706, 708 are in device-to-device communication and the wireless devices 710, 712 are in device-to-device communication. The wireless device 712 is also communicating with the base station 404.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on Flash-LinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

In an aspect, communication between mobile terminals in a wide area network (WAN) scenario is facilitated through uplink/downlink channels between the mobile terminals and a base station. In the case that two communicating mobile terminals are in the vicinity of each other, direct peer-to-peer communication between the mobile terminals without traversing through the base station may reduce a base station load.

WAN may be deployed in two modes, frequency division duplex (FDD) and time division duplex (TDD). Due to implementation issues, FDD may be preferred because devices in a FDD spectrum do not have to switch between transmitting and receiving in the same spectrum at all times.

By contrast, peer-to-peer communication typically occurs over a short distance and is usually not power-limited. Additionally, peer-to-peer communication is, by nature, symmetrical. Thus, it lends itself better to a TDD method of communication. In the present disclosure, a method, apparatus, and computer program product are provided to deploy peer-to-peer communication in a LTE TDD system by configuring portions of LTE TDD subframes to be used for peer-to-peer communication.

In LTE TDD, three types of subframes may be provided: 1) a downlink subframe; 2) an uplink subframe; and 3) a special subframe. A method for configuring each of the types of subframes for peer-to-peer communication is described below.

Figure 8:
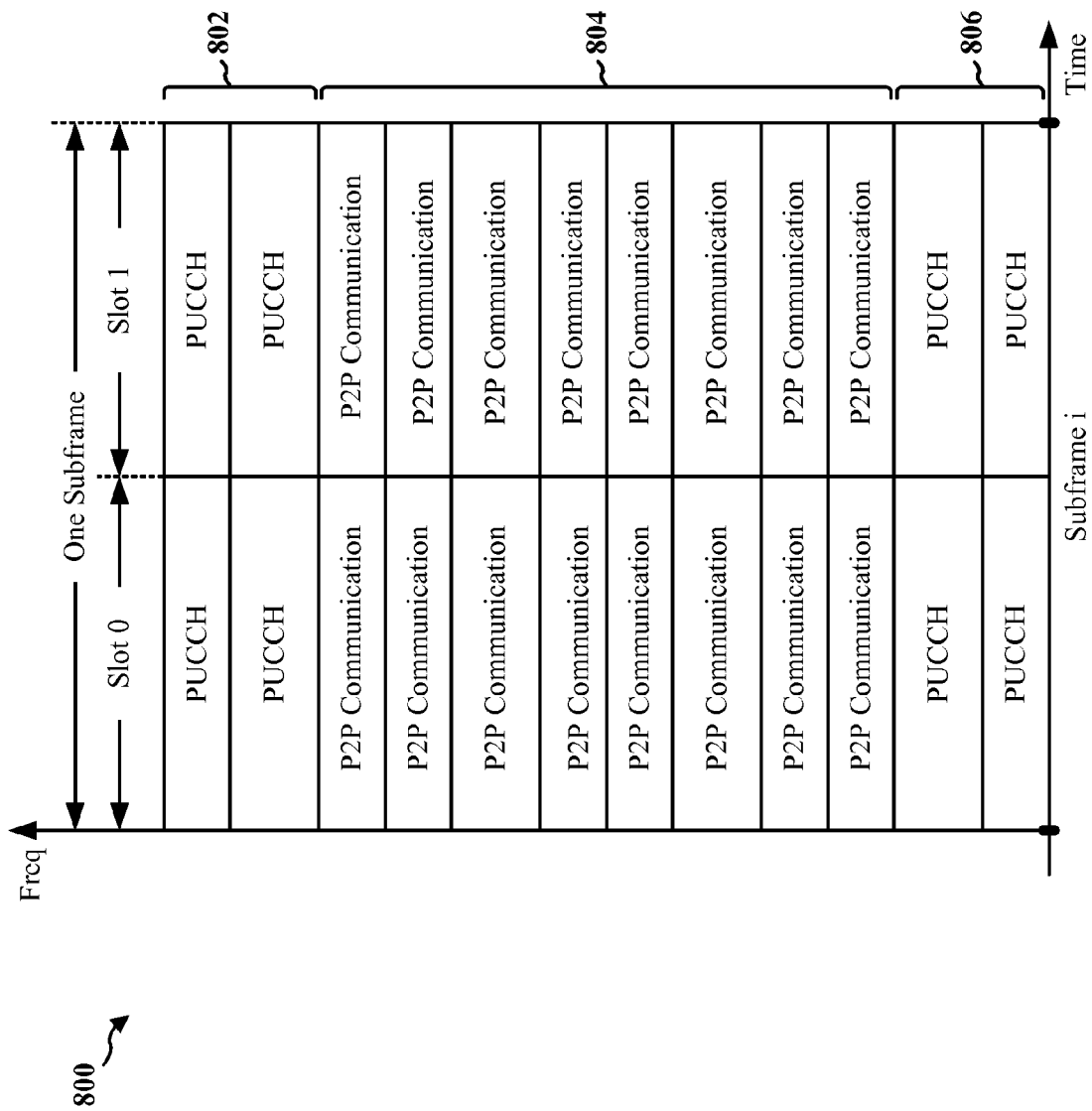
FIG. 8 is diagram illustrating an exemplary uplink subframe having portions configured for peer-to-peer communication.

FIG. 8 is diagram 800 illustrating an exemplary uplink subframe having portions configured for peer-to-peer communication. Referring to FIG. 4 above, PUSCH, PUCCH, PRACH, and sounding reference signal (SRS) channels may be provided in the uplink subframe. Among the channels, PUCCH conveys important control signals and may be allocated at the two edges of the LTE TDD frequency band.

When configuring the uplink subframe for peer-to-peer communication, PUCCH may remain allocated at the two edges of the LTE TDD frequency band. For example, referring to FIG. 8, a particular number of resource blocks (RBs) at a first edge 802 and a second edge 806 of the uplink subframe may be assigned to UEs for transmitting PUCCH to a base station. The rest of the RBs located at a central portion 804 in the uplink subframe may be assigned to UEs for performing peer-to-peer communication.

Figure 9:
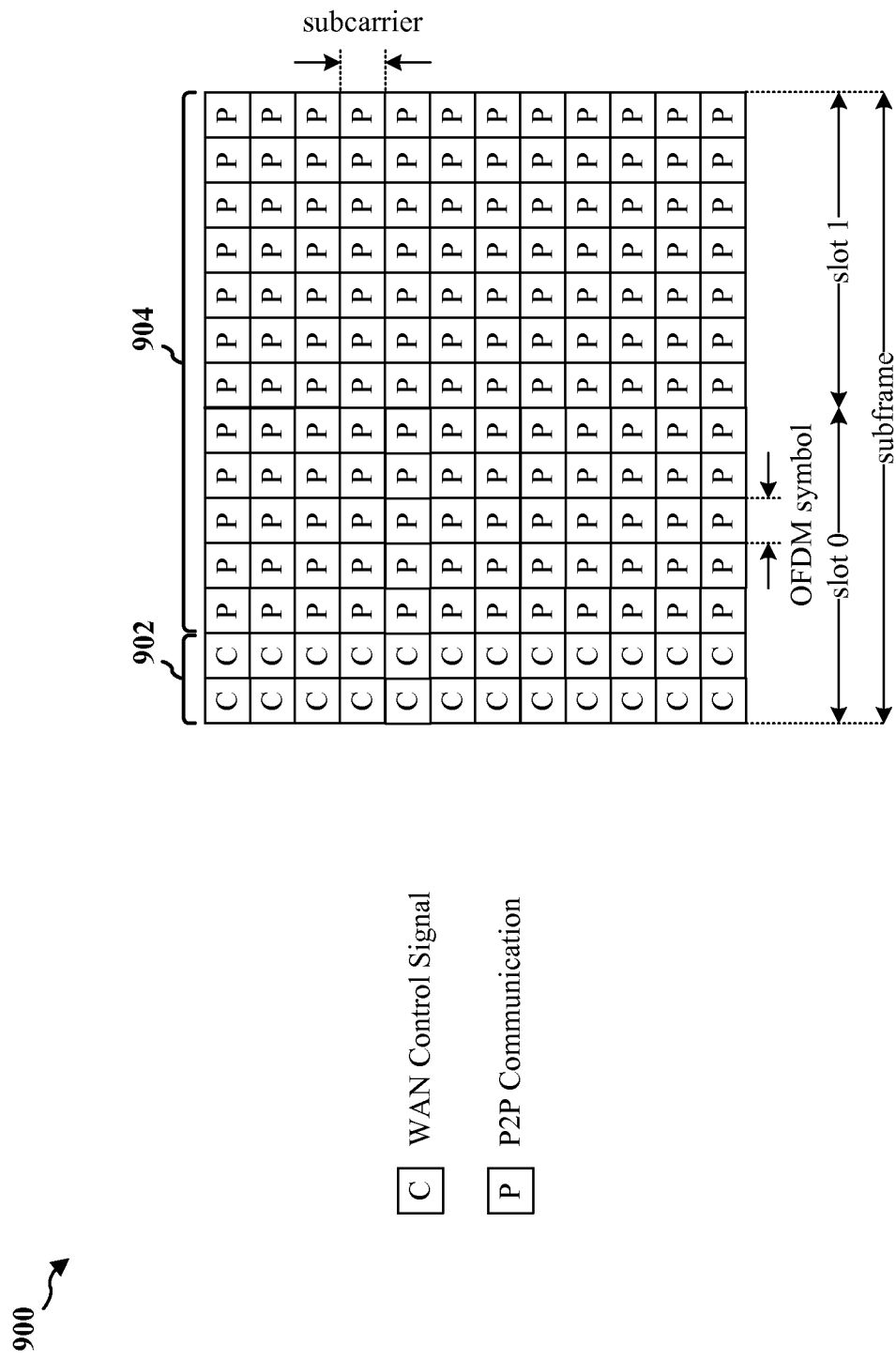
FIG. 9 is diagram illustrating an exemplary downlink subframe having portions configured for peer-to-peer communication.

FIG. 9 is diagram 900 illustrating an exemplary downlink subframe having portions configured for peer-to-peer communication. In a normal downlink subframe, a sounding reference signal (SRS) may be transmitted. To avoid interference between peer-to-peer communication and an LTE SRS, the downlink subframe may be configured as a multicast broadcast single frequency network (MBSFN) subframe accommodating peer-to-peer communication. For example, referring to FIG. 9, in the downlink subframe configured as the MBSFN subframe, the first one or two symbols of the downlink subframe (control region 902) may be used to send wide area network (WAN) control signals to one or more UEs. The rest of the symbols of the downlink subframe (MBSFN region 904) may be assigned to UEs for performing peer-to-peer communication.

Figure 10:
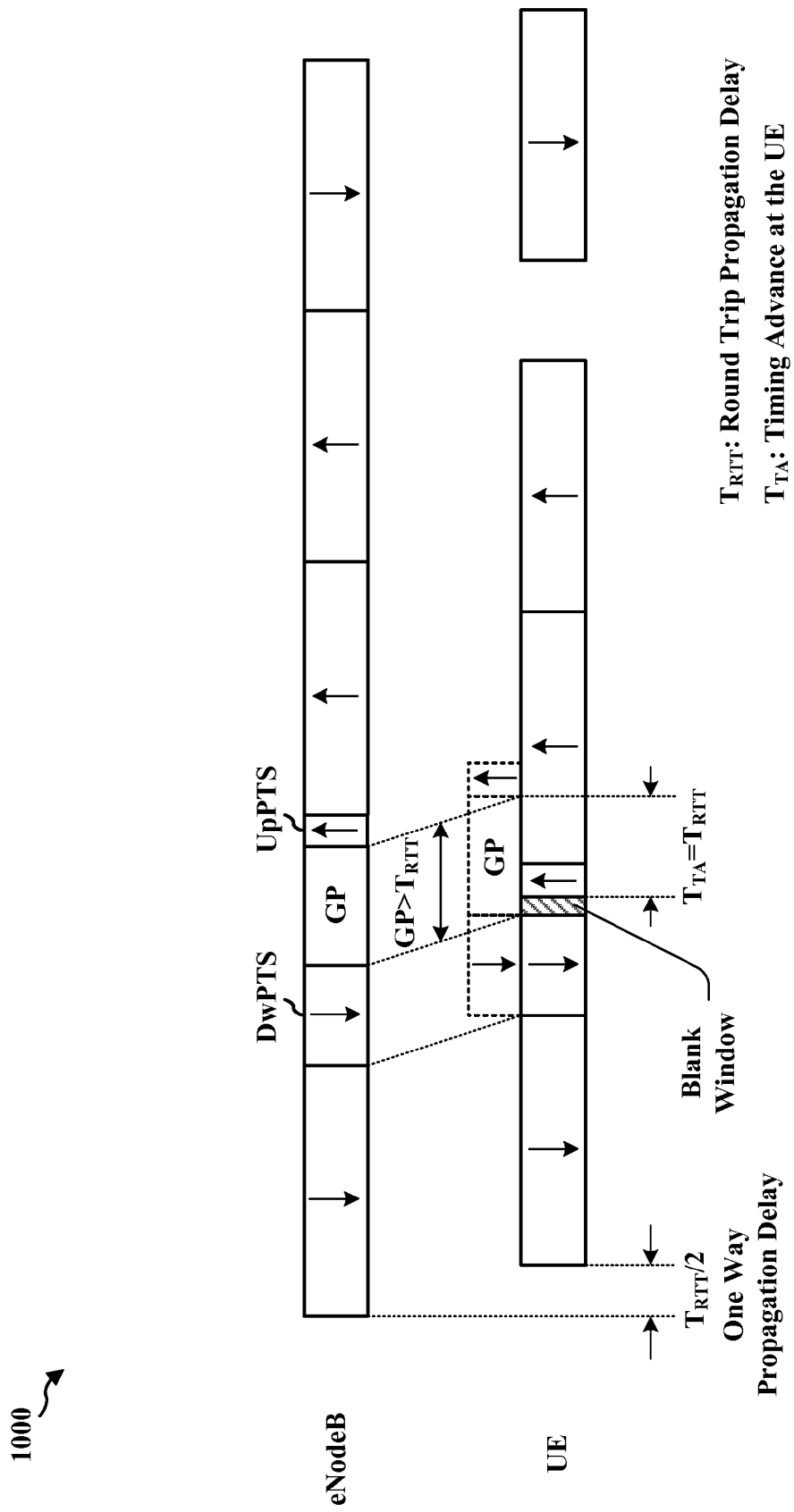
FIG. 10 is a diagram illustrating an exemplary structure of a special subframe in LTE time division duplex (TDD).

FIG. 10 is a diagram 1000 illustrating an exemplary structure of a special subframe in LTE time division duplex (TDD). A guard period (GP) is used for transitioning between downlink (e.g., downlink pilot time slot (DwPTS)) and uplink (e.g., uplink pilot time slot (UpPTS)) and for a transmission-reception (Tx-Rx) switch. Different configurations of the guard period are shown in Table 1 below. To configure the special subframe for peer-to-peer communication, a large guard period may be used. Accordingly, a portion (e.g., blank window) may be maintained at a beginning and/or end of the guard period, while the rest of the guard period may be used for peer-to-peer communication. The portion (blank window) may be reserved for an uplink timing advance and/or switching from transmission to reception and/or reception to transmission. The blank window at the beginning and/or end of the guard period avoids overlap between the peer-to-peer communication and LTE communication.

TABLE 1

| Configu-ration | Normal Cyclic Prefix | | | | Extended Cyclic Prefix | | | |
|---|---|---|---|---|---|---|---|---|
| | DwPTS | GP | UpPTS | Cell Size (km) | DwPTS | GP | UpPTS | Cell size (km) |
| 0 | 3 | 10 | 1 | 101 | 3 | 8 | 1 | 94 |
| 1 | 9 | 4 | 1 | 37 | 8 | 3 | 1 | 32 |
| 2 | 10 | 3 | 1 | 26 | 9 | 2 | 1 | 19 |
| 3 | 11 | 2 | 1 | 15 | 10 | 1 | 1 | 7 |
| 4 | 12 | 1 | 1 | 5 | 3 | 7 | 2 | 82 |
| 5 | 3 | 9 | 2 | 90 | 8 | 2 | 2 | 19 |
| 6 | 9 | 3 | 2 | 26 | 9 | 1 | 2 | 7 |
| 7 | 10 | 2 | 2 | 15 | | | | |
| 8 | 11 | 1 | 2 | 5 | | | | |

In an aspect, because the UpPTS of a special subframe contains only SRS or PRACH, the guard period may be used such that an entire UpPTS may be configured for peer-to-peer communication. In this case, a blank window at the end of the guard period would not be needed. Rather, a blank window located immediately before the beginning of an uplink transmission of an LTE access link would be utilized.

To save power in peer-to-peer communication, continuous LTE TDD subframes may be configured to be used for peer-to-peer communication. Uplink/downlink configurations for LTE TDD are shown in Table 2 below. Downlink subframes #0, #1, #5 or #6 may carry system synchronization signals, and therefore, may not be configured as MBSFN subframes. To support delay-sensitive traffic of LTE (e.g., voice traffic), not every uplink subframe in a radio frame should be configured to support peer-to-peer communication.

In an aspect, downlink subframes that are not downlink subframe #0, #1, #5, or #6 do not carry system synchronization signals and may therefore be configured as MBSFN subframes supporting peer-to-peer communication. Moreover, a guard period in special subframes may be configured to support peer-to-peer communication. Also, all uplink subframes, except for at least one, may be configured to be used for peer-to-peer communication. The at least one uplink subframe may be configured for a WAN communication.

TABLE 2

| Uplink/ Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 11:
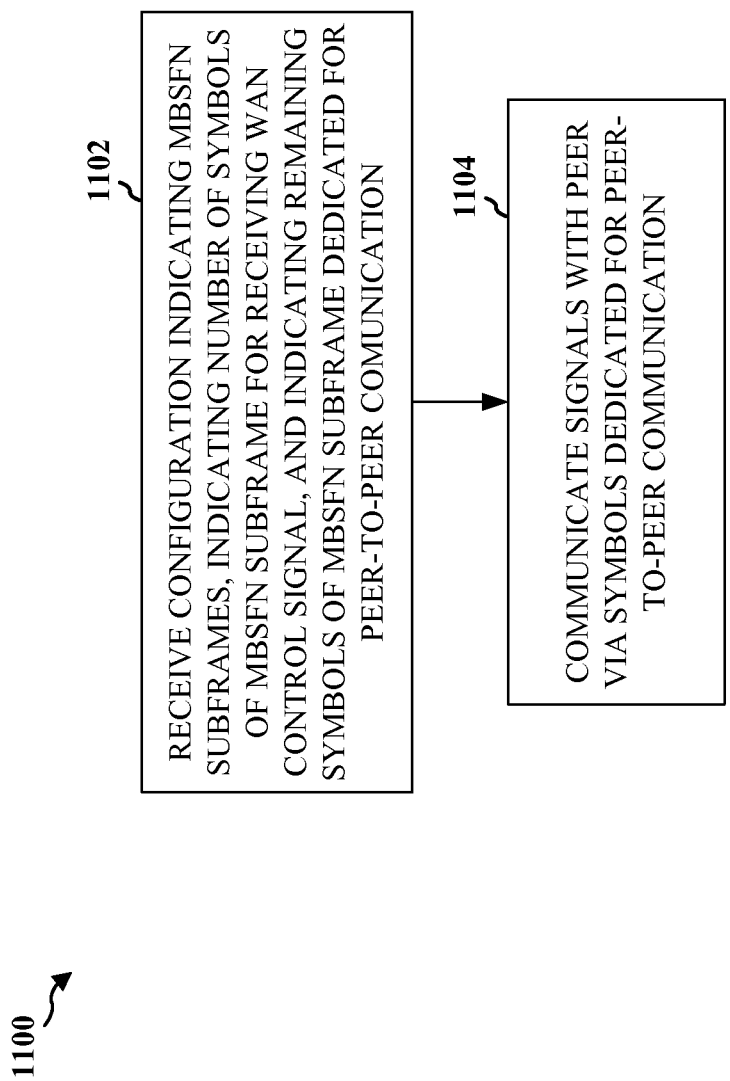
FIG. 11 is a flow chart of a method of wireless communication.

FIG. 11 is a flow chart 1100 of a method of wireless communication. The method may be performed by a UE. At step 1102, the UE receives from a base station a configuration indicating multicast broadcast single frequency network (MBSFN) subframes within a radio frame. The configuration may be received via a system information message. The configuration indicates a number of symbols of an MBSFN subframe for receiving a wide area network (WAN) control signal. The configuration also indicates remaining symbols of the MBSFN subframe dedicated for peer-to-peer communication. At step 1104, the UE communicates signals with a peer via the symbols dedicated for peer-to-peer communication.

Figure 12:
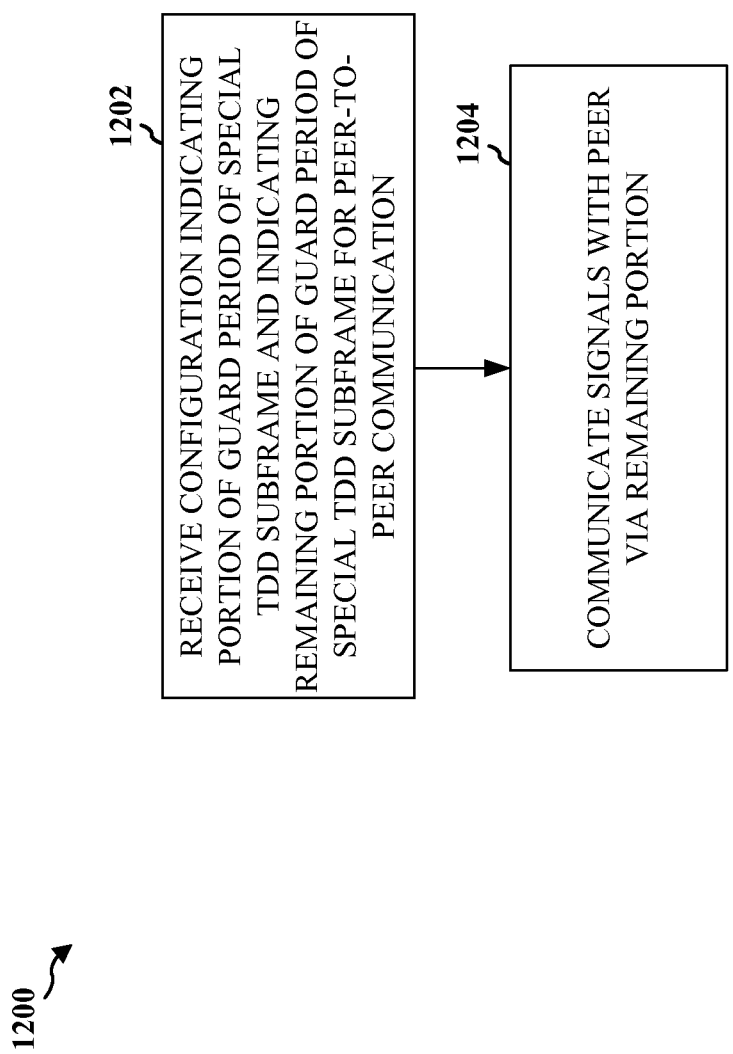
FIG. 12 is a flow chart of a method of wireless communication.

FIG. 12 is a flow chart 1200 of a method of wireless communication. The method may be performed by a UE. At step 1202, the UE receives a configuration indicating a portion at a beginning and/or end of a guard period of a special time division duplex (TDD) subframe. The configuration may be received via a system information message. The portion may be reserved for at least one of an uplink timing advance or switching from transmission to reception and/or reception to transmission. The configuration also indicates a remaining portion of the guard period of the special TDD subframe for peer-to-peer communication. At step 1204, the UE communicates signals with a peer via the remaining portion.

Figure 13:
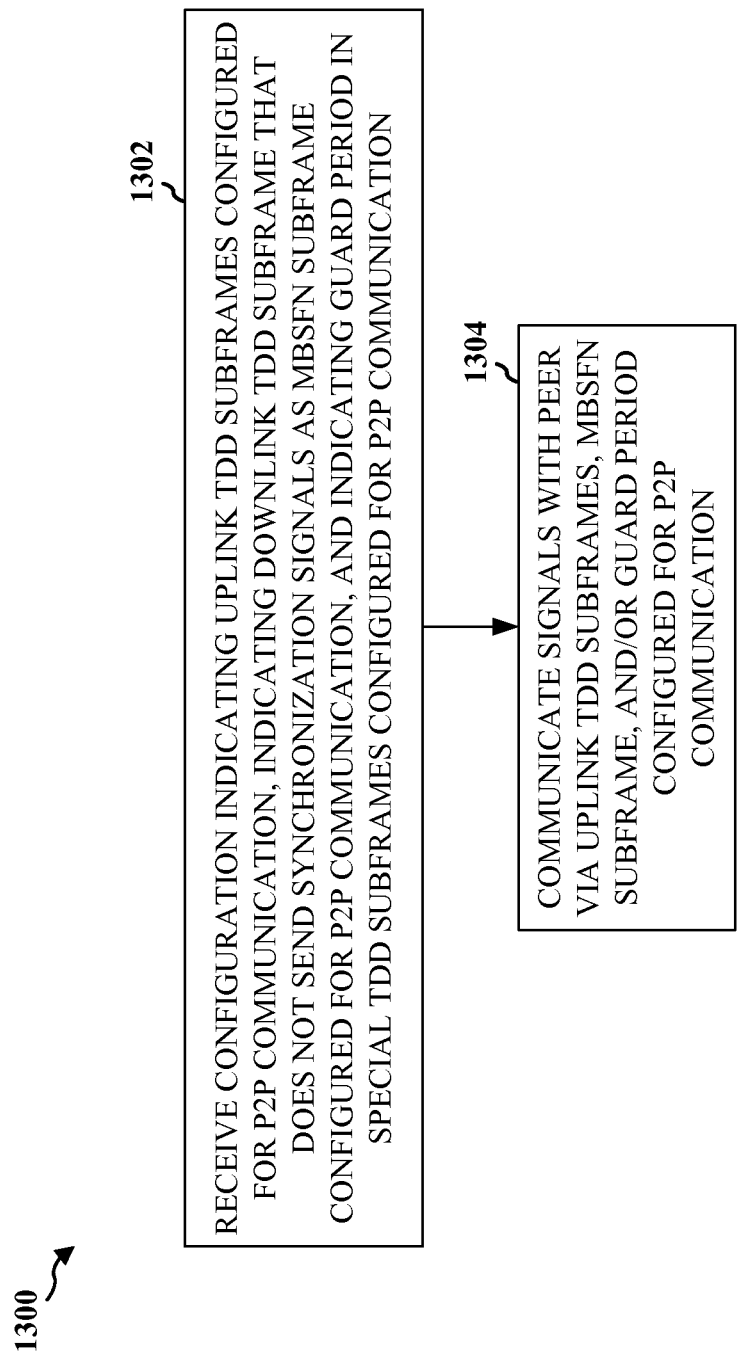
FIG. 13 is a flow chart of a method of wireless communication.

FIG. 13 is a flow chart 1300 of a method of wireless communication. The method may be performed by a UE. At step 1302, the UE receives a configuration. The configuration may be received via a system information message. The configuration may indicate uplink time division duplex (TDD) subframes of a radio frame configured for peer-to-peer communication. At least one uplink TDD subframe of the radio frame may be dedicated for a wide area network (WAN) communication. The configuration may also indicate at least one downlink TDD subframe of the radio frame that does not send system synchronization signals as a multicast broadcast single frequency network (MBSFN) subframe, wherein the MBSFN subframe is configured for peer-to-peer communication. The configuration may further indicate a guard period in special TDD subframes of the radio frame configured for peer-to-peer communication. At step 1303, the UE communicates signals with a peer via at least one of the uplink TDD subframes, the MBSFN subframe, or the guard period configured for peer-to-peer communication.

Figure 14:
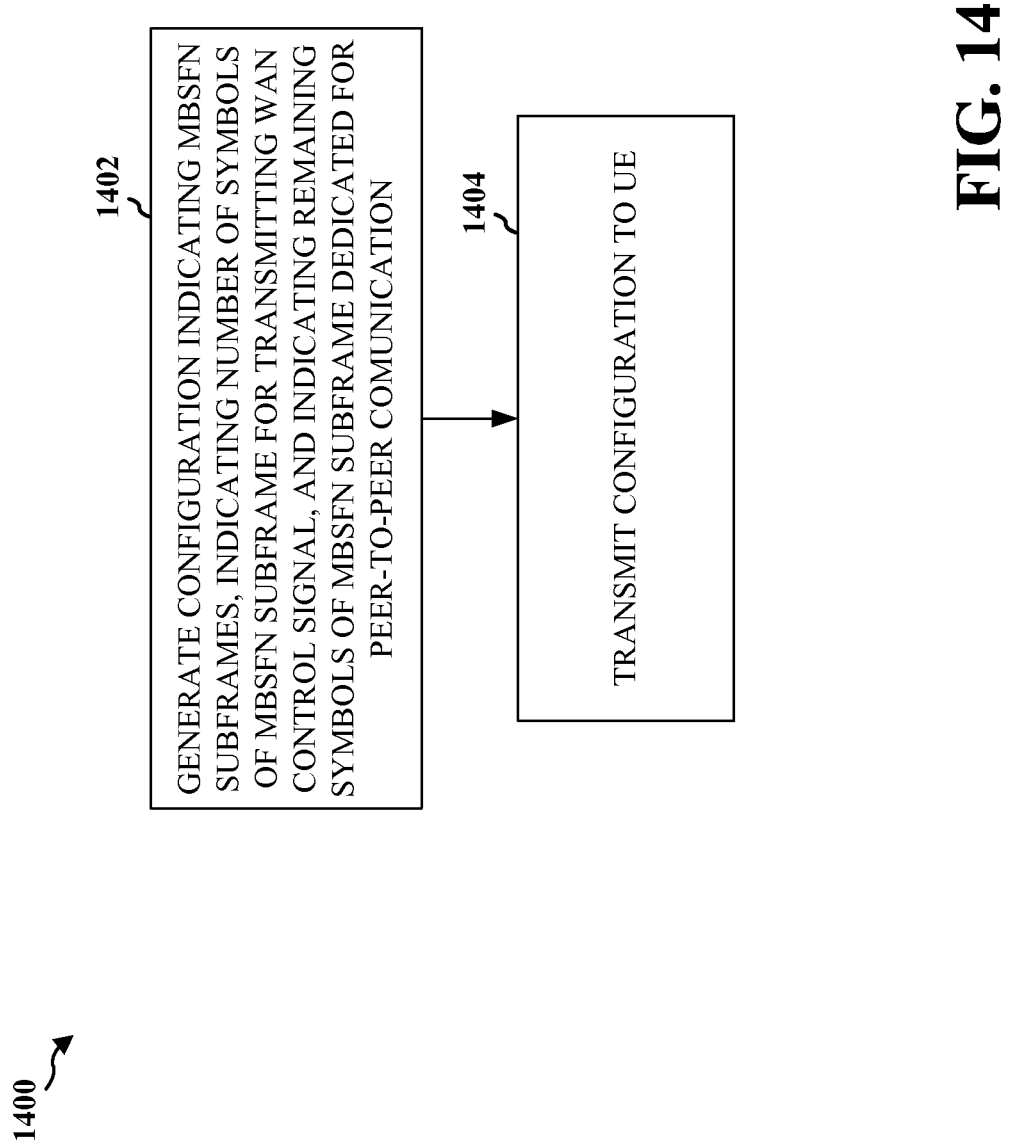
FIG. 14 is a flow chart of a method of wireless communication.

FIG. 14 is a flow chart 1400 of a method of wireless communication. The method may be performed by a base station. At step 1402, the base station generates a configuration indicating multicast broadcast single frequency network (MBSFN) subframes within a radio frame. The configuration indicates a number of symbols of an MBSFN subframe for transmitting a wide area network (WAN) control signal. The configuration also indicates remaining symbols of the MBSFN subframe dedicated for peer-to-peer communication. At step 1404, the base station transmits the configuration to at least one user equipment (UE). The configuration may be transmitted via a system information message.

Figure 15:
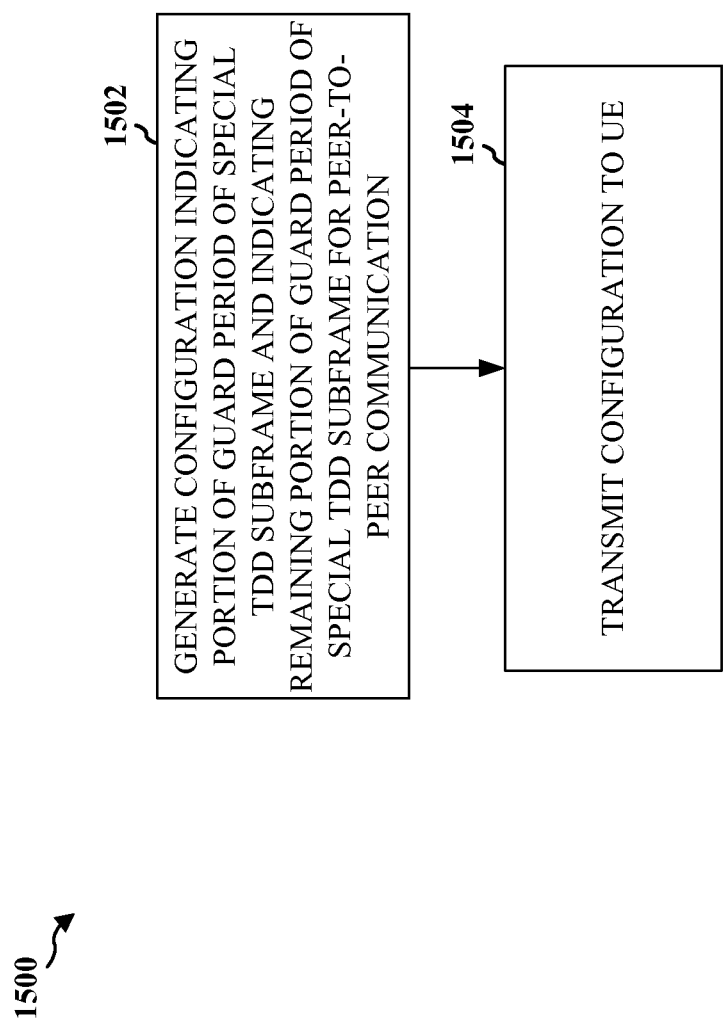
FIG. 15 is a flow chart of a method of wireless communication.

FIG. 15 is a flow chart 1500 of a method of wireless communication. The method may be performed by a base station. At step 1502, the base station generates a configuration indicating a portion at a beginning and/or end of a guard period of a special time division duplex (TDD) subframe. The portion may be reserved for at least one of an uplink timing advance or switching from transmission to reception and/or reception to transmission. The configuration also indicates a remaining portion of the guard period of the special TDD subframe for peer-to-peer communication. At step 1504, the base station transmits the configuration to at least one user equipment (UE). The configuration may be transmitted via a system information message.

Figure 16:
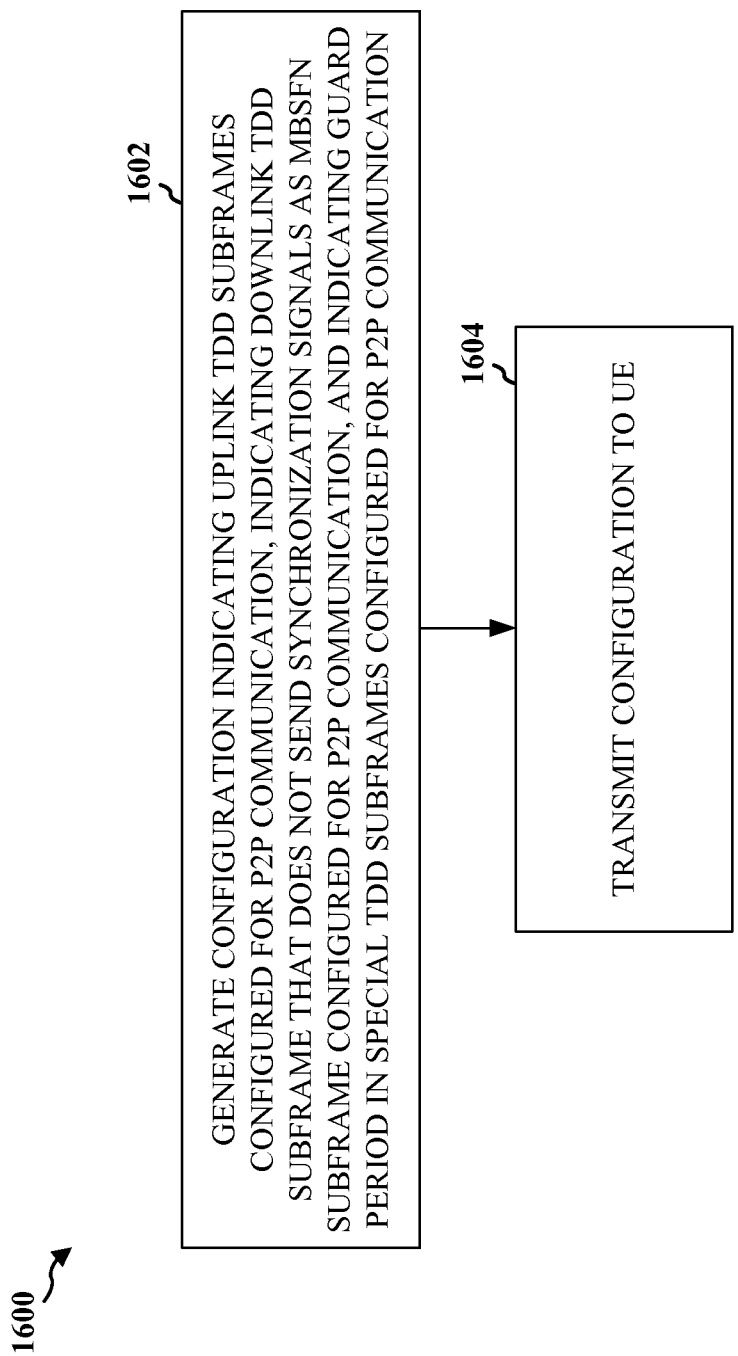
FIG. 16 is a flow chart of a method of wireless communication.

FIG. 16 is a flow chart 1600 of a method of wireless communication. The method may be performed by a base station. At step 1602, the base station generates a configuration. The configuration indicates uplink time division duplex (TDD) subframes of a radio frame configured for peer-to-peer communication. At least one uplink TDD subframe of the radio frame may be dedicated for a wide area network (WAN) communication. The configuration also indicates at least one downlink TDD subframe of the radio frame that does not send system synchronization signals as a multicast broadcast single frequency network (MBSFN) subframe, wherein the MBSFN subframe is configured for peer-to-peer communication. The configuration also indicates a guard period in special TDD subframes of the radio frame configured for peer-to-peer communication. At step 1604, the base station transmits the configuration to at least one user equipment (UE). The configuration may be transmitted via a system information message.

Figure 17:
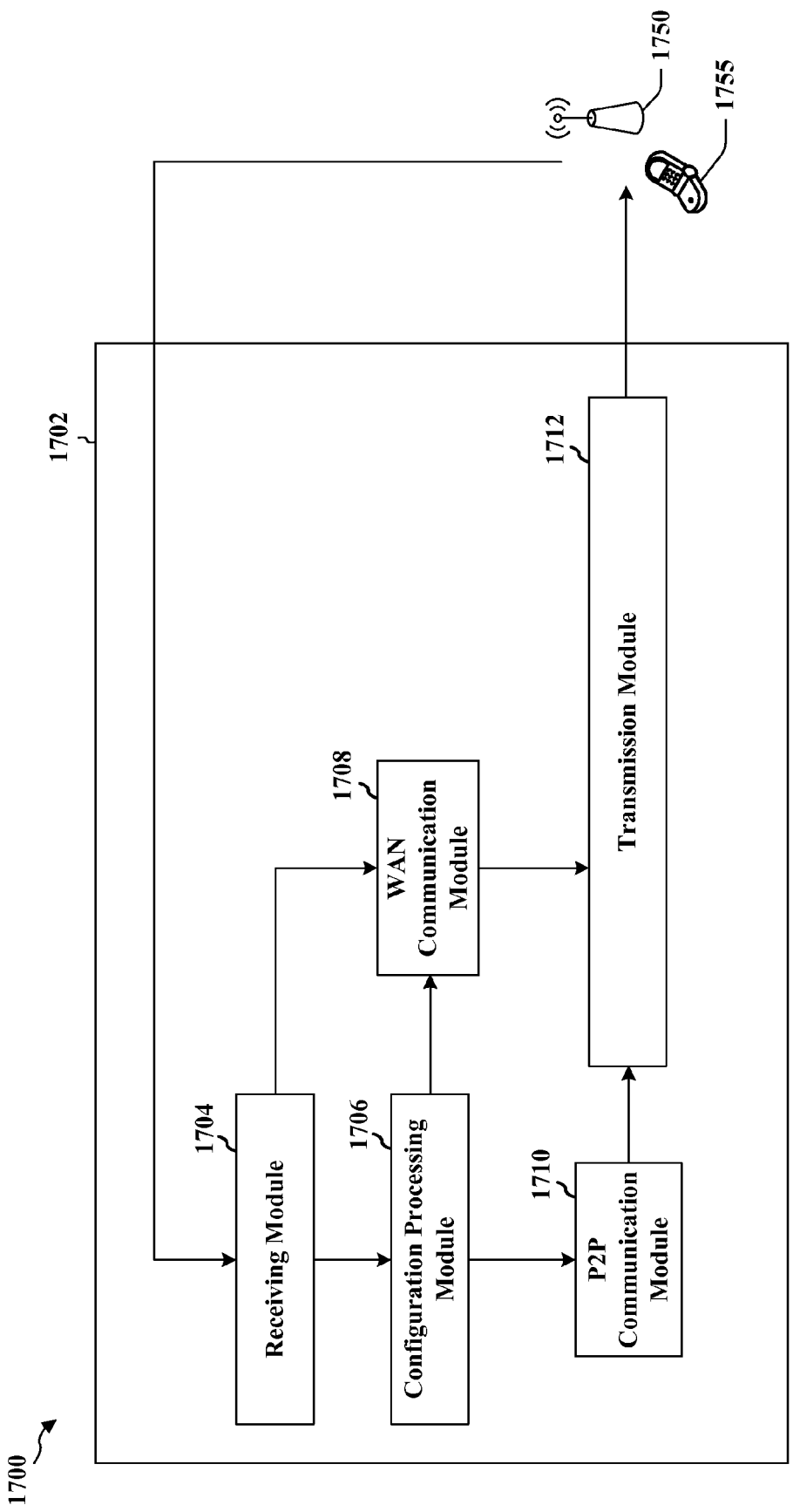
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a UE. The apparatus includes a receiving module 1704, a configuration processing module 1706, a wide area network (WAN) communication module 1708, a peer-to-peer (P2P) communication module 1710, and a transmission module 1712.

In one aspect, the configuration processing module 1706 receives from a base station 1750 (via the receiving module 1704) a configuration indicating multicast broadcast single frequency network (MBSFN) subframes within a radio frame. The receiving module 1704 may receive the configuration via a system information message. The configuration indicates a number of symbols of an MBSFN subframe for the WAN communication module 1708 to receive a WAN control signal from the base station 1750. The configuration also indicates remaining symbols of the MBSFN subframe dedicated for peer-to-peer communication. The P2P communication module 1710 may communicate signals with a peer 1755 (via the transmission module 1712) according to the symbols dedicated for peer-to-peer communication.

In another aspect, the configuration processing module 1706 receives from the base station 1750 (via the receiving module 1704) a configuration indicating a portion at a beginning and/or end of a guard period of a special time division duplex (TDD) subframe. The receiving module 1704 may receive the configuration via a system information message. The portion may be reserved for at least one of an uplink timing advance or switching from transmission to reception and/or reception to transmission. The configuration also indicates a remaining portion of the guard period of the special TDD subframe for peer-to-peer communication. The P2P communication module 1710 may communicate signals with the peer 1755 (via the transmission module 1712) according to the remaining portion.

In a further aspect, the configuration processing module 1706 receives from the base station 1750 (via the receiving module 1704) a configuration indicating uplink time division duplex (TDD) subframes of a radio frame configured for peer-to-peer communication. The receiving module 1704 may receive the configuration via a system information message. At least one uplink TDD subframe of the radio frame may be dedicated for a wide area network (WAN) communication via the WAN communication module 1708. The configuration may also indicate at least one downlink TDD subframe of the radio frame that does not send system synchronization signals as a multicast broadcast single frequency network (MBSFN) subframe, wherein the MBSFN subframe is configured for peer-to-peer communication. The configuration may further indicate a guard period in special TDD subframes of the radio frame configured for peer-to-peer communication. The P2P communication module 1710 may communicate signals with the peer 1755 (via the transmission module 1712) according to at least one of the uplink TDD subframes, the MBSFN subframe, or the guard period configured for peer-to-peer communication.

Figure 18:
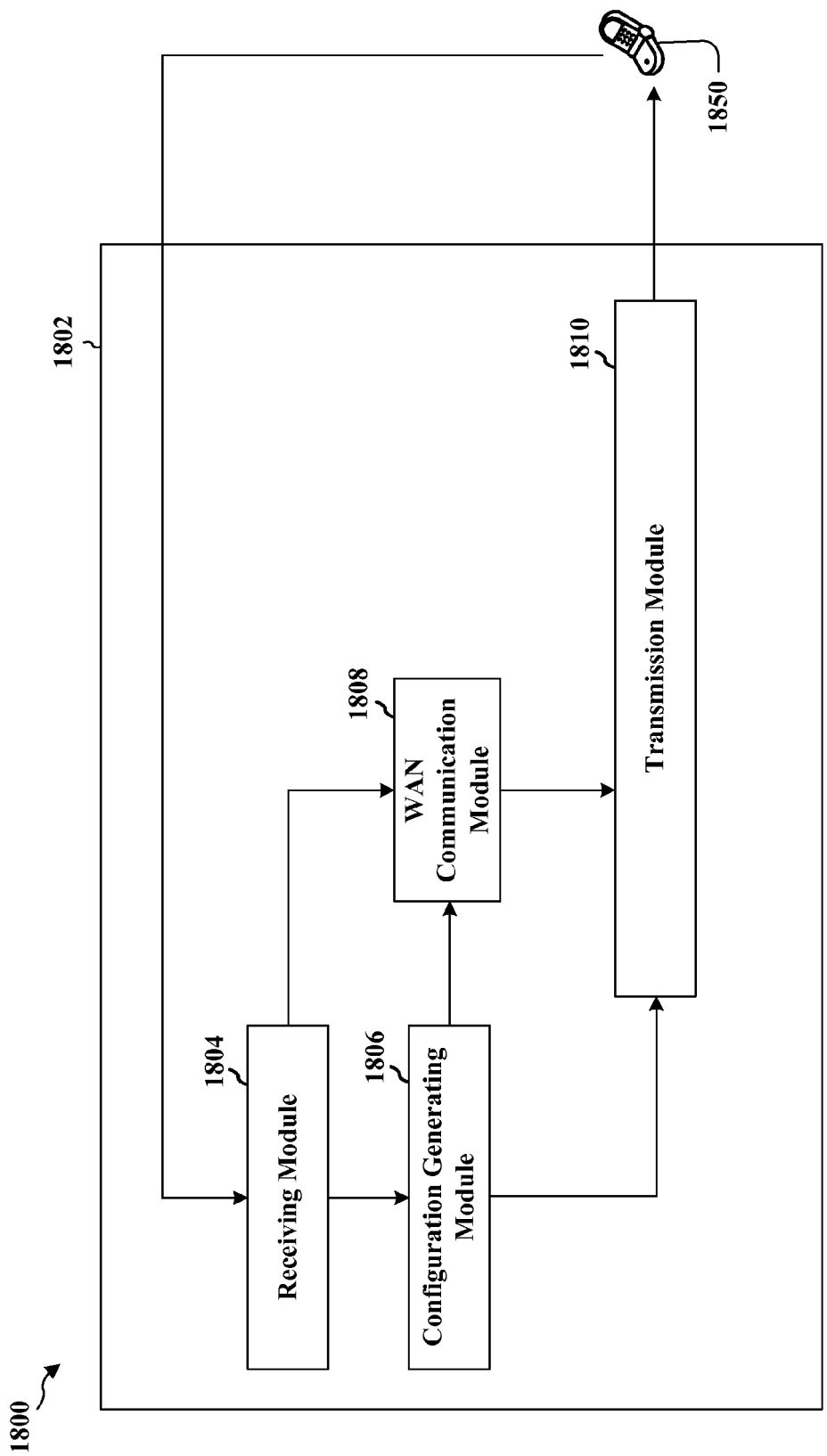
FIG. 18 is a conceptual data flow diagram illustrating the data flow between different modules/means/components in an exemplary apparatus.

FIG. 18 is a conceptual data flow diagram 1800 illustrating the data flow between different modules/means/components in an exemplary apparatus 1802. The apparatus may be a base station. The apparatus includes a receiving module 1804, a configuration generating module 1806, a wide area network (WAN) communication module 1808, and a transmission module 1810.

In one aspect, the configuration generating module 1808 generates a configuration indicating multicast broadcast single frequency network (MBSFN) subframes within a radio frame. The configuration indicates a number of symbols of an MBSFN subframe for transmitting a wide area network (WAN) control signal via the WAN communication module 1808. The configuration also indicates remaining symbols of the MBSFN subframe dedicated for peer-to-peer communication. The configuration generating module 1806 transmits the configuration (via the transmission module 1810) to at least one user equipment (UE) 1850. The transmission module 1810 may transmit the configuration via a system information message.

In another aspect, the configuration generating module 1808 generates a configuration indicating a portion at a beginning and/or end of a guard period of a special time division duplex (TDD) subframe. The portion may be reserved for at least one of an uplink timing advance or switching from transmission to reception and/or reception to transmission. The configuration also indicates a remaining portion of the guard period of the special TDD subframe for peer-to-peer communication. The configuration generating module 1806 transmits the configuration (via the transmission module 1810) to the at least one user equipment (UE) 1850. The transmission module 1810 may transmit the configuration via a system information message.

In a further aspect, the configuration generating module 1808 generates a configuration. The configuration indicates uplink time division duplex (TDD) subframes of a radio frame configured for peer-to-peer communication. At least one uplink TDD subframe of the radio frame may be dedicated for a wide area network (WAN) communication via the WAN communication module 1808. The configuration also indicates at least one downlink TDD subframe of the radio frame that does not send system synchronization signals as a multicast broadcast single frequency network (MBSFN) subframe, wherein the MBSFN subframe is configured for peer-to-peer communication. The configuration also indicates a guard period in special TDD subframes of the radio frame configured for peer-to-peer communication. The configuration generating module 1806 transmits the configuration (via the transmission module 1810) to the at least one user equipment (UE) 1850. The transmission module 1810 may transmit the configuration via a system information message.

The apparatus may include additional modules that perform each of the steps of the algorithm in the aforementioned flow charts of FIGS. 11-16. As such, each step in the aforementioned flow charts of FIGS. 11-16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
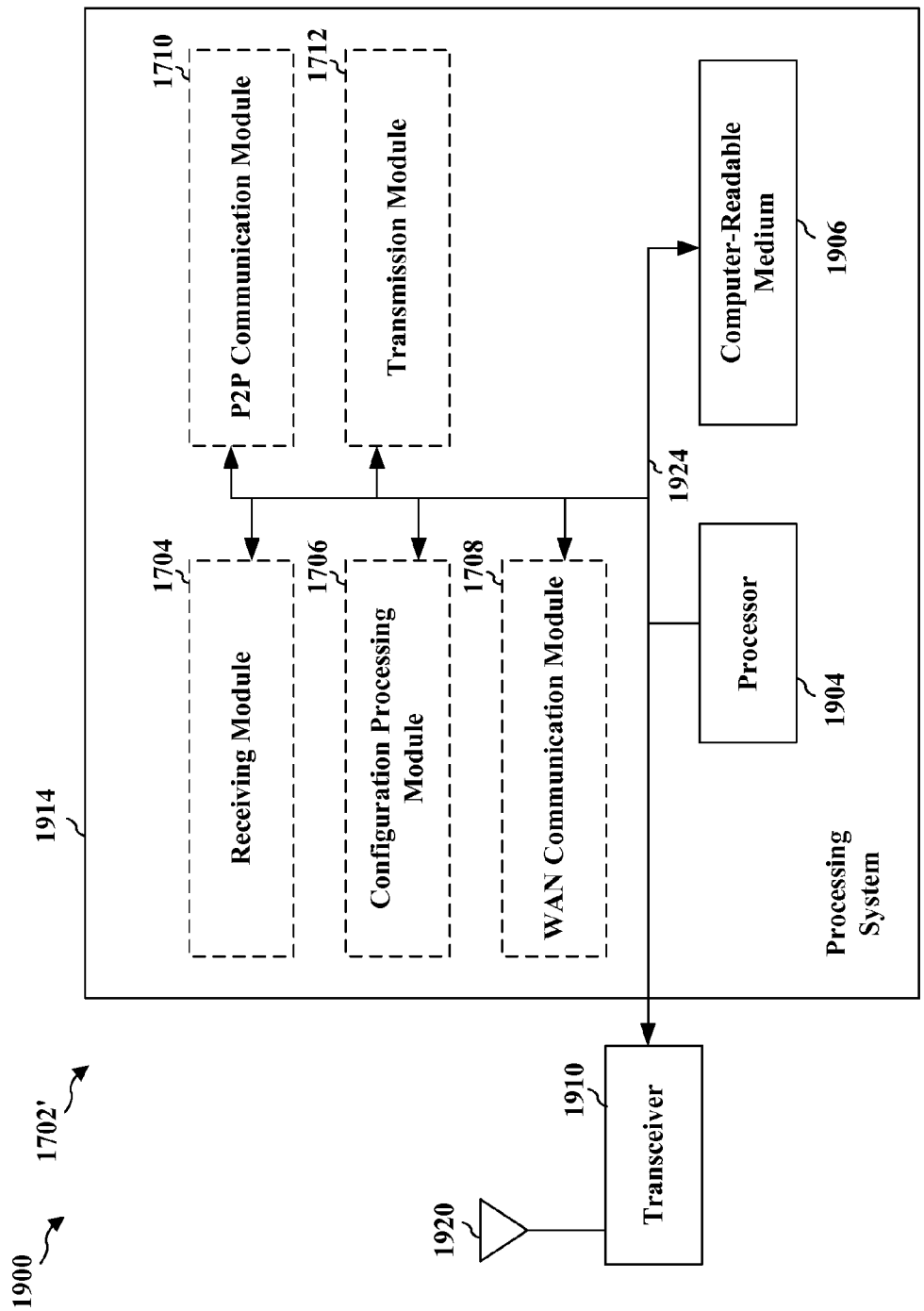
FIG. 19 is a diagram illustrating an example of a hardware implementation for an apparatus employing a processing system.

FIG. 19 is a diagram 1900 illustrating an example of a hardware implementation for an apparatus 1702' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1704, 1206, 1708, 1710, 1712 and the computer-readable medium 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the receiving module 1704. In addition, the transceiver 1910 receives information from the processing system 1914, specifically the transmission module 1712, and based on the received information, generates a signal to be applied to the one or more antennas 1920. The processing system 1914 includes a processor 1904 coupled to a computer-readable medium 1906. The processor 1904 is responsible for general processing, including the execution of software stored on the computer-readable medium 1906. The software, when executed by the processor 1904, causes the processing system 1914 to perform the various functions described supra for any particular apparatus. The computer-readable medium 1906 may also be used for storing data that is manipulated by the processor 1904 when executing software. The processing system further includes at least one of the modules 1704, 1206, 1708, 1710, and 1712. The modules may be software modules running in the processor 1904, resident/stored in the computer readable medium 1906, one or more hardware modules coupled to the processor 1904, or some combination thereof. The processing system 1914 may be a component of the UE 650 and may include the memory 660 and/or at least one of the TX processor 668, the RX processor 656, and the controller/processor 659.

In one configuration, the apparatus 1702/1702' for wireless communication includes means for receiving a configuration indicating multicast broadcast single frequency network (MBSFN) subframes within a radio frame, the configuration indicating a number of symbols of an MBSFN subframe for receiving a wide area network (WAN) control signal, the configuration indicating remaining symbols of the MBSFN subframe dedicated for peer-to-peer communication, means for communicating signals with a peer via the symbols dedicated for peer-to-peer communication, means for receiving a configuration indicating a portion at a beginning and/or end of a guard period of a special time division duplex (TDD) subframe, the configuration indicating a remaining portion of the guard period of the special TDD subframe for peer-to-peer communication, means for communicating signals with a peer via the remaining portion, means for receiving a configuration indicating uplink time division duplex (TDD) subframes of a radio frame configured for peer-to-peer communication, the configuration indicating at least one downlink TDD subframe of the radio frame that does not send system synchronization signals as a multicast broadcast single frequency network (MBSFN) subframe, the MBSFN subframe configured for peer-to-peer communication, the configuration indicating a guard period in special TDD subframes of the radio frame configured for peer-to-peer communication, and means for communicating signals with a peer via at least one of the uplink TDD subframes, the MBSFN subframe, or the guard period configured for peer-to-peer communication.

The aforementioned means may be one or more of the aforementioned modules of the apparatus 1702 and/or the processing system 1914 of the apparatus 1702' configured to perform the functions recited by the aforementioned means. As described supra, the processing system 1914 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 20:
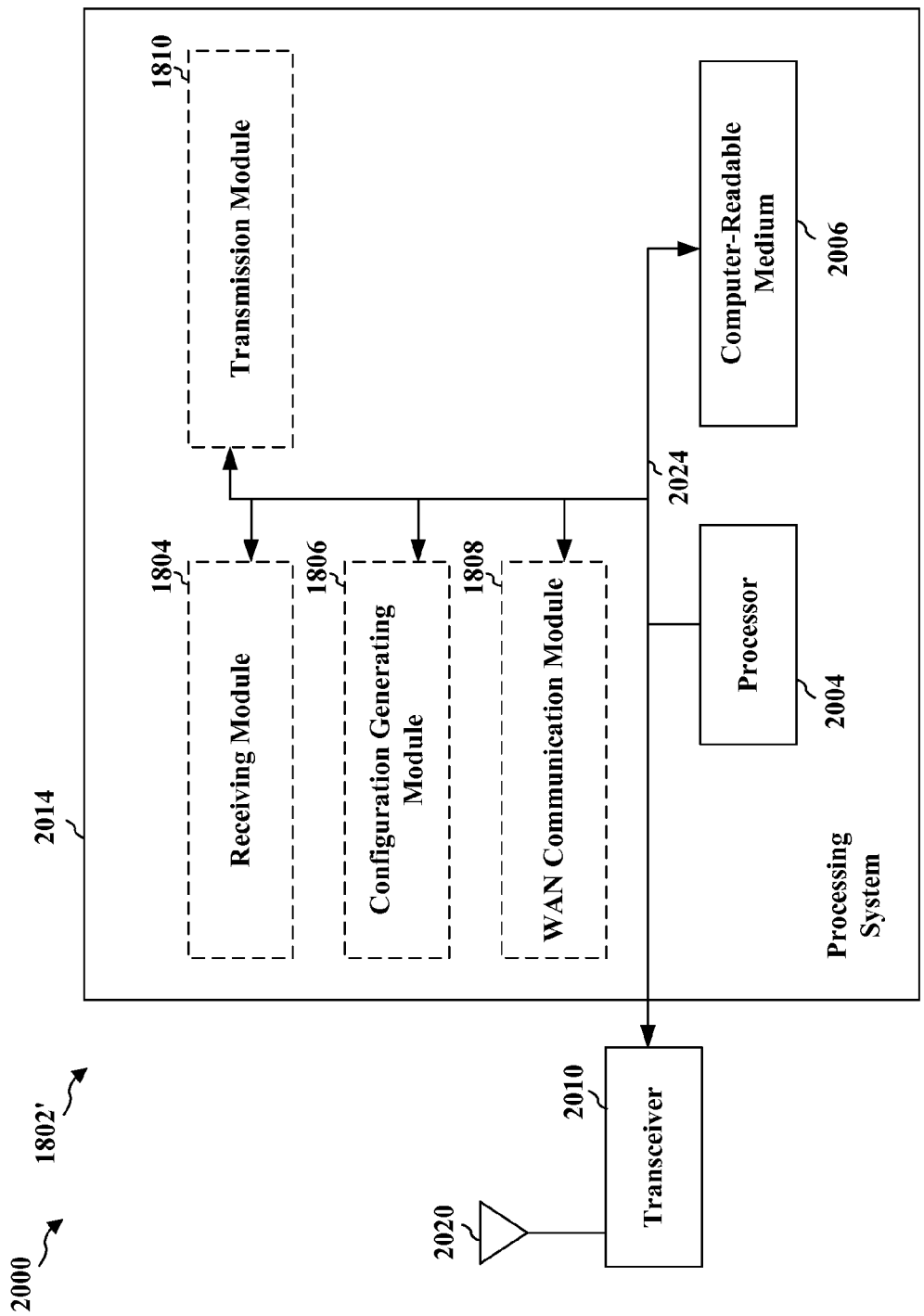
FIG. 20 is a diagram illustrating an example of a hardware implementation for an apparatus employing a processing system.

FIG. 20 is a diagram 2000 illustrating an example of a hardware implementation for an apparatus 1802' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1804, 1806, 1808, 1810, and the computer-readable medium 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the receiving module 1804. In addition, the transceiver 2010 receives information from the processing system 2014, specifically the transmission module 1810, and based on the received information, generates a signal to be applied to the one or more antennas 2020. The processing system 2014 includes a processor 2004 coupled to a computer-readable medium 2006. The processor 2004 is responsible for general processing, including the execution of software stored on the computer-readable medium 2006. The software, when executed by the processor 2004, causes the processing system 2014 to perform the various functions described supra for any particular apparatus. The computer-readable medium 2006 may also be used for storing data that is manipulated by the processor 2004 when executing software. The processing system further includes at least one of the modules 1804, 1806, 1808, and 1810. The modules may be software modules running in the processor 2004, resident/stored in the computer readable medium 2006, one or more hardware modules coupled to the processor 2004, or some combination thereof. The processing system 2014 may be a component of the eNB 610 and may include the memory 676 and/or at least one of the TX processor 616, the RX processor 670, and the controller/processor 675.

In one configuration, the apparatus 1802/1802' for wireless communication includes means for generating a configuration indicating multicast broadcast single frequency network (MBSFN) subframes within a radio frame, the configuration indicating a number of symbols of an MBSFN subframe for transmitting a wide area network (WAN) control signal, the configuration indicating remaining symbols of the MBSFN subframe dedicated for peer-to-peer communication, means for generating a configuration indicating a portion at a beginning and/or end of a guard period of a special time division duplex (TDD) subframe, the configuration indicating a remaining portion of the guard period of the special TDD subframe for peer-to-peer communication, means for generating a configuration indicating uplink time division duplex (TDD) subframes of a radio frame configured for peer-to-peer communication, the configuration indicating at least one downlink TDD subframe of the radio frame that does not send system synchronization signals as a multicast broadcast single frequency network (MBSFN) subframe, the MBSFN subframe configured for peer-to-peer communication, the configuration indicating a guard period in special TDD subframes of the radio frame configured for peer-to-peer communication, and means for transmitting the configuration to at least one user equipment (UE).

The aforementioned means may be one or more of the aforementioned modules of the apparatus 1802 and/or the processing system 2014 of the apparatus 1802' configured to perform the functions recited by the aforementioned means. As described supra, the processing system 2014 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving a configuration indicating multicast broadcast single frequency network (MBSFN) subframes within a radio frame, the configuration indicating a number of symbols of an MBSFN subframe for receiving a wide area network (WAN) control signal, the configuration indicating remaining symbols of the MBSFN subframe dedicated for peer-to-peer communication signals; and
communicating peer-to-peer communication signals with a peer via the symbols dedicated for peer-to-peer communication in the MBSFN subframe in accordance with the configuration.

2. The method of claim 1, wherein the configuration is received via a system information message.

3. A method of wireless communication, comprising:
receiving a configuration indicating a portion at a beginning and/or end of a guard period of a special time division duplex (TDD) subframe, the configuration indicating a remaining portion of the guard period of the special TDD subframe for peer-to-peer communication signals; and
communicating peer-to-peer communication signals with a peer via the remaining portion of the guard period of the special TDD subframe.

4. The method of claim 3, wherein the portion is reserved for at least one of:
an uplink timing advance; or
switching from transmission to reception and/or reception to transmission.

5. The method of claim 3, wherein the configuration is received via a system information message.

6. A method of wireless communication, comprising:
receiving a configuration indicating maintaining physical uplink control channels (PUCCHs) of uplink time division duplex (TDD) subframes of a radio frame and using rest of resource blocks other than the PUCCHs of the uplink TDD subframes for peer-to-peer communication signals,
the configuration indicating at least one downlink TDD subframe of the radio frame that does not send system synchronization signals as a multicast broadcast single frequency network (MBSFN) subframe, the MBSFN subframe configured for peer-to-peer communication signals,
the configuration indicating a guard period in special TDD subframes of the radio frame configured for peer-to-peer communication signals; and
communicating peer-to-peer communication signals with a peer via at least one of the rest of resource blocks of the uplink TDD subframes while maintaining the PUCCHs of the uplink TDD subframes, the MBSFN subframe, or the guard period of the special TDD subframe configured for peer-to-peer communication signals.

7. The method of claim 6, wherein at least one uplink TDD subframe of the radio frame is dedicated for a wide area network (WAN) communication.

8. The method of claim 6, wherein the configuration is received via a system information message.

9. A method of wireless communication, comprising:
generating a configuration indicating multicast broadcast single frequency network (MBSFN) subframes within a radio frame, the configuration indicating a number of symbols of an MBSFN subframe for transmitting a wide area network (WAN) control signal, the configuration indicating remaining symbols of the MBSFN subframe dedicated for peer-to-peer communication signals; and
transmitting the configuration to at least one user equipment (UE).

10. The method of claim 9, wherein the configuration is transmitted via a system information message.

11. A method of wireless communication, comprising:
generating a configuration indicating a portion at a beginning and/or end of a guard period of a special time division duplex (TDD) subframe, the configuration indicating a remaining portion of the guard period of the special TDD subframe for peer-to-peer communication signals; and
transmitting the configuration to at least one user equipment (UE).

12. The method of claim 11, wherein the portion is reserved for at least one of:
an uplink timing advance; or
switching from transmission to reception and/or reception to transmission.

13. The method of claim 11, wherein the configuration is transmitted via a system information message.

14. A method of wireless communication, comprising:
generating a configuration indicating maintaining physical uplink control channels (PUCCHs) of uplink time division duplex (TDD) subframes of a radio frame and using rest of resource blocks other than the PUCCHs of the uplink TDD subframes for peer-to-peer communication signals,
the configuration indicating at least one downlink TDD subframe of the radio frame that does not send system synchronization signals as a multicast broadcast single frequency network (MBSFN) subframe, the MBSFN subframe configured for peer-to-peer communication signals,
the configuration indicating a guard period in special TDD subframes of the radio frame configured for peer-to-peer communication signals; and
transmitting the configuration to at least one user equipment (UE).

15. The method of claim 14, wherein at least one uplink TDD subframe of the radio frame is dedicated for a wide area network (WAN) communication.

16. The method of claim 14, wherein the configuration is transmitted via a system information message.

17. An apparatus of wireless communication, comprising:
means for receiving a configuration indicating multicast broadcast single frequency network (MBSFN) subframes within a radio frame, the configuration indicating a number of symbols of an MBSFN subframe for receiving a wide area network (WAN) control signal, the configuration indicating remaining symbols of the MBSFN subframe dedicated for peer-to-peer communication signals; and
means for communicating peer-to-peer communication signals with a peer via the symbols dedicated for peer-to-peer communication in the MBSFN subframe in accordance with the configuration.

18. The apparatus of claim 17, wherein the configuration is received via a system information message.

19. An apparatus for wireless communication, comprising:
means for receiving a configuration indicating a portion at a beginning and/or end of a guard period of a special time division duplex (TDD) subframe, the configuration indicating a remaining portion of the guard period of the special TDD subframe for peer-to-peer communication signals; and
means for communicating peer-to-peer communication signals with a peer via the remaining portion of the guard period of the special TDD subframe.

20. The apparatus of claim 19, wherein the portion is reserved for at least one of:
an uplink timing advance; or
switching from transmission to reception and/or reception to transmission.

21. The apparatus of claim 19, wherein the configuration is received via a system information message.

22. An apparatus for wireless communication, comprising:
means for receiving a configuration indicating maintaining physical uplink control channels (PUCCHs) of uplink time division duplex (TDD) subframes of a radio frame and using rest of resource blocks other than the PUCCHs of the uplink TDD subframes for peer-to-peer communication signals,
the configuration indicating at least one downlink TDD subframe of the radio frame that does not send system synchronization signals as a multicast broadcast single frequency network (MBSFN) subframe, the MBSFN subframe configured for peer-to-peer communication signals,
the configuration indicating a guard period in special TDD subframes of the radio frame configured for peer-to-peer communication signals; and
means for communicating peer-to-peer communication signals with a peer via at least one of the rest of resource blocks of the uplink TDD subframes while maintaining the PUCCHs of the uplink TDD subframes, the MBSFN subframe, or the guard period of the special TDD subframe configured for peer-to-peer communication signals.

23. The apparatus of claim 22, wherein at least one uplink TDD subframe of the radio frame is dedicated for a wide area network (WAN) communication.

24. The apparatus of claim 22, wherein the configuration is received via a system information message.

25. An apparatus for wireless communication, comprising:
means for generating a configuration indicating multicast broadcast single frequency network (MBSFN) subframes within a radio frame, the configuration indicating a number of symbols of an MBSFN subframe for transmitting a wide area network (WAN) control signal, the configuration indicating remaining symbols of the MBSFN subframe dedicated for peer-to-peer communication signals; and
means for transmitting the configuration to at least one user equipment (UE).

26. The apparatus of claim 25, wherein the configuration is transmitted via a system information message.

27. An apparatus for wireless communication, comprising:
means for generating a configuration indicating a portion at a beginning and/or end of a guard period of a special time division duplex (TDD) subframe, the configuration indicating a remaining portion of the guard period of the special TDD subframe for peer-to-peer communication signals; and means for transmitting the configuration to at least one user equipment (UE).

28. The apparatus of claim 27, wherein the portion is reserved for at least one of:
an uplink timing advance; or
switching from transmission to reception and/or reception to transmission.

29. The apparatus of claim 27, wherein the configuration is transmitted via a system information message.

30. An apparatus for wireless communication, comprising:
means for generating a configuration indicating maintaining physical uplink control channels (PUCCHs) of uplink time division duplex (TDD) subframes of a radio frame and using rest of resource blocks other than the PUCCHs of the uplink TDD subframes for peer-to-peer communication signals,
the configuration indicating at least one downlink TDD subframe of the radio frame that does not send system synchronization signals as a multicast broadcast single frequency network (MBSFN) subframe, the MBSFN subframe configured for peer-to-peer communication signals,
the configuration indicating a guard period in special TDD subframes of the radio frame configured for peer-to-peer communication signals; and
means for transmitting the configuration to at least one user equipment (UE).

31. The apparatus of claim 30, wherein at least one uplink TDD subframe of the radio frame is dedicated for a wide area network (WAN) communication.

32. The apparatus of claim 30, wherein the configuration is transmitted via a system information message.

33. An apparatus for wireless communication, comprising:
a processing system configured to:
receive a configuration indicating multicast broadcast single frequency network (MBSFN) subframes within a radio frame, the configuration indicating a number of symbols of an MBSFN subframe for receiving a wide area network (WAN) control signal, the configuration indicating remaining symbols of the MBSFN subframe dedicated for peer-to-peer communication signals; and
communicate peer-to-peer communication signals with a peer via the symbols dedicated for peer-to-peer communication in the MBSFN subframe in accordance with the configuration.

34. The apparatus of claim 33, wherein the configuration is received via a system information message.

35. An apparatus for wireless communication, comprising:
a processing system configured to:
receive a configuration indicating a portion at a beginning and/or end of a guard period of a special time division duplex (TDD) subframe, the configuration indicating a remaining portion of the guard period of the special TDD subframe for peer-to-peer communication signals; and
communicate peer-to-peer communication signals with a peer via the remaining portion of the guard period of the special TDD subframe.

36. The apparatus of claim 35, wherein the portion is reserved for at least one of:
an uplink timing advance; or
switching from transmission to reception and/or reception to transmission.

37. The apparatus of claim 35, wherein the configuration is received via a system information message.

38. An apparatus for wireless communication, comprising:
a processing system configured to:
receive a configuration indicating maintaining physical uplink control channels (PUCCHs) of uplink time division duplex (TDD) subframes of a radio frame and using rest of resource blocks other than the PUCCHs of the uplink TDD subframes for peer-to-peer communication signals,
the configuration indicating at least one downlink TDD subframe of the radio frame that does not send system synchronization signals as a multicast broadcast single frequency network (MBSFN) subframe, the MBSFN subframe configured for peer-to-peer communication signals,
the configuration indicating a guard period in special TDD subframes of the radio frame configured for peer-to-peer communication signals; and
communicate peer-to-peer communication signals with a peer via at least one of the rest of resource blocks of the uplink TDD subframes while maintaining the PUCCHs of the uplink TDD subframes, the MBSFN subframe, or the guard period of the special TDD subframe configured for peer-to-peer communication signals.

39. The apparatus of claim 38, wherein at least one uplink TDD subframe of the radio frame is dedicated for a wide area network (WAN) communication.

40. The apparatus of claim 38, wherein the configuration is received via a system information message.

41. An apparatus for wireless communication, comprising:
a processing system configured to:
generate a configuration indicating multicast broadcast single frequency network (MBSFN) subframes within a radio frame, the configuration indicating a number of symbols of an MBSFN subframe for transmitting a wide area network (WAN) control signal, the configuration indicating remaining symbols of the MBSFN subframe dedicated for peer-to-peer communication signals; and
transmit the configuration to at least one user equipment (UE).

42. The apparatus of claim 41, wherein the configuration is transmitted via a system information message.

43. An apparatus for wireless communication, comprising:
a processing system configured to:
generate a configuration indicating a portion at a beginning and/or end of a guard period of a special time division duplex (TDD) subframe, the configuration indicating a remaining portion of the guard period of the special TDD subframe for peer-to-peer communication signals; and
transmit the configuration to at least one user equipment (UE).

44. The apparatus of claim 43, wherein the portion is reserved for at least one of:
an uplink timing advance; or
switching from transmission to reception and/or reception to transmission.

45. The apparatus of claim 43, wherein the configuration is transmitted via a system information message.

46. An apparatus for wireless communication, comprising:
a processing system configured to:
generate a configuration indicating maintaining physical uplink control channels (PUCCHs) of uplink time division duplex (TDD) subframes of a radio frame and using rest of resource blocks other than the PUCCHs of the uplink TDD subframes for peer-to-peer communication signals,
the configuration indicating at least one downlink TDD subframe of the radio frame that does not send system synchronization signals as a multicast broadcast single frequency network (MBSFN) subframe, the MBSFN subframe configured for peer-to-peer communication signals, the configuration indicating a guard period in special TDD subframes of the radio frame configured for peer-to-peer communication signals; and transmit the configuration to at least one user equipment (UE).

47. The apparatus of claim 46, wherein at least one uplink TDD subframe of the radio frame is dedicated for a wide area network (WAN) communication.

48. The apparatus of claim 46, wherein the configuration is transmitted via a system information message.

49. A computer-readable medium storing computer executable code for wireless communication, comprising code for:

receiving a configuration indicating multicast broadcast single frequency network (MBSFN) subframes within a radio frame, the configuration indicating a number of symbols of an MBSFN subframe for receiving a wide area network (WAN) control signal, the configuration indicating remaining symbols of the MBSFN subframe dedicated for peer-to-peer communication signals; and communicating peer-to-peer communication signals with a peer via the symbols dedicated for peer-to-peer communication in the MBSFN subframe in accordance with the configuration.

50. A computer-readable medium storing computer executable code for wireless communication, comprising code for:

receiving a configuration indicating a portion at a beginning and/or end of a guard period of a special time division duplex (TDD) subframe, the configuration indicating a remaining portion of the guard period of the special TDD subframe for peer-to-peer communication signals; and communicating peer-to-peer communication signals with a peer via the remaining portion of the guard period of the special TDD subframe.

51. A computer-readable medium storing computer executable code for wireless communication, comprising code for:

receiving a configuration indicating maintaining physical uplink control channels (PUCCHs) of uplink time division duplex (TDD) subframes of a radio frame and using rest of resource blocks other than the PUCCHs of the uplink TDD subframes for peer-to-peer communication signals, the configuration indicating at least one downlink TDD subframe of the radio frame that does not send system synchronization signals as a multicast broadcast single frequency network (MBSFN) subframe, the MBSFN subframe configured for peer-to-peer communication signals, the configuration indicating a guard period in special TDD subframes of the radio frame configured for peer-to-peer communication signals; and communicating peer-to-peer communication signals with a peer via at least one of the rest of resource blocks of the uplink TDD subframes while maintaining the PUCCHs of the uplink TDD subframes, the MBSFN subframe, or the guard period of the special TDD subframe configured for peer-to-peer communication signals.

52. A computer-readable medium storing computer executable code for wireless communication, comprising code for:

generating a configuration indicating multicast broadcast single frequency network (MBSFN) subframes within a radio frame, the configuration indicating a number of symbols of an MBSFN subframe for transmitting a wide area network (WAN) control signal, the configuration indicating remaining symbols of the MBSFN subframe dedicated for peer-to-peer communication signals; and transmitting the configuration to at least one user equipment (UE).

53. A computer-readable medium storing computer executable code for wireless communication, comprising code for:

generating a configuration indicating a portion at a beginning and/or end of a guard period of a special time division duplex (TDD) subframe, the configuration indicating a remaining portion of the guard period of the special TDD subframe for peer-to-peer communication signals; and transmitting the configuration to at least one user equipment (UE).

54. A computer-readable medium storing computer executable code for wireless communication, comprising code for:

generating a configuration indicating maintaining physical uplink control channels (PUCCHs) of uplink time division duplex (TDD) subframes of a radio frame and using rest of resource blocks other than the PUCCHs of the uplink TDD subframes for peer-to-peer communication signals, the configuration indicating at least one downlink TDD subframe of the radio frame that does not send system synchronization signals as a multicast broadcast single frequency network (MBSFN) subframe, the MBSFN subframe configured for peer-to-peer communication signals, the configuration indicating a guard period in special TDD subframes of the radio frame configured for peer-to-peer communication signals; and transmitting the configuration to at least one user equipment (UE).

\* \* \* \* \*